(12) United States Patent
Borgemenke et al.

(10) Patent No.: US 12,162,325 B2
(45) Date of Patent: Dec. 10, 2024

(54) SUSPENSION HYDRAULIC LIFT ACTUATOR FOR AXLE TRIM HEIGHT CONTROL

(71) Applicant: BeijingWest Industries Co., Ltd., Beijing (CN)

(72) Inventors: Daniel Norbert Borgemenke, Springboro, OH (US); Adam Michael Osswald, Eaton, OH (US); David Fredrick Reuter, Beavercreek, OH (US); Michael William Landis, Bellbrook, OH (US); Earl Wayne Lloyd, Lebanon, OH (US); Randall L. Derr, Bellbrook, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 201 days.

(21) Appl. No.: 17/699,140

(22) Filed: Mar. 20, 2022

(65) Prior Publication Data

US 2022/0314728 A1    Oct. 6, 2022

Related U.S. Application Data

(60) Provisional application No. 63/168,592, filed on Mar. 31, 2021.

(30) Foreign Application Priority Data

Feb. 21, 2022    (CN) .......................... 202210157290.5

(51) Int. Cl.
*B60G 17/08* (2006.01)
*B60G 17/04* (2006.01)
*B60G 17/056* (2006.01)

(52) U.S. Cl.
CPC ......... *B60G 17/08* (2013.01); *B60G 17/0408* (2013.01); *B60G 17/0565* (2013.01);
(Continued)

(58) Field of Classification Search
CPC .................... F04B 23/06; F04B 23/026; F15B 2211/20576; F15B 2211/50578;
(Continued)

(56) References Cited

U.S. PATENT DOCUMENTS

| | | | | |
|---|---|---|---|---|
| 2,560,293 A | * | 7/1951 | Kempton | G05D 23/1393 137/550 |
| 2,869,892 A | * | 1/1959 | Sahagian | B60G 21/06 280/124.16 |

(Continued)

FOREIGN PATENT DOCUMENTS

| | | |
|---|---|---|
| CN | 202782561 U | 3/2013 |
| CN | 207028756 U | 2/2018 |

(Continued)

OTHER PUBLICATIONS

First Office Action and Search Report issued on Jul. 26, 2023, for counterpart Chinese Patent Application No. 202210157290.5, along with machine translation.

(Continued)

*Primary Examiner* — Timothy Wilhelm
(74) *Attorney, Agent, or Firm* — Dickinson Wright PLLC

(57) ABSTRACT

A hydraulic actuator for a vehicle suspension includes: a pump assembly including an electric motor coupled to first and second pumps to transfer hydraulic fluid to a discharge header; a first isolation valve having an elastomeric seat and configured to selectively block fluid flow from a port in fluid communication with a height-adjustable damper to the discharge header; and a second isolation valve having a metal seat and connected in series with the first isolation valve to selectively block fluid flow from the port to the discharge header. The first pump transfers hydraulic fluid from a supply fluid passage to a first discharge header, and the second pump transfers hydraulic fluid from the supply fluid passage to a second discharge header. A recirculation valve (Continued)

selectively controls fluid flow from the second discharge header to the supply fluid passage.

19 Claims, 34 Drawing Sheets

(52) U.S. Cl.
CPC .... *B60G 2202/413* (2013.01); *B60G 2400/51* (2013.01); *B60G 2400/5182* (2013.01); *B60G 2400/71* (2013.01); *B60G 2400/7162* (2013.01); *B60G 2500/02* (2013.01); *B60G 2500/30* (2013.01); *B60G 2500/302* (2013.01); *B60G 2800/914* (2013.01)

(58) Field of Classification Search
CPC ....... F16H 39/20; B60G 17/056; B60G 17/08; B60G 2500/30; B60G 2800/914; B60G 17/0408; B60G 2202/413; B60G 2400/51; B60G 2400/5182; B60G 2400/71; B60G 2400/7162; B60G 2500/02; B60G 17/0565; B60G 2500/302; F04C 14/24; F04C 2/24

See application file for complete search history.

(56) References Cited

U.S. PATENT DOCUMENTS

| | | | | | |
|---|---|---|---|---|---|
| 2,895,744 | A * | 7/1959 | Jackson | | B60G 17/033 |
| | | | | | 280/DIG. 1 |
| 3,083,033 | A | 3/1963 | Fiala | | |
| 3,194,579 | A | 7/1965 | Peras | | |
| 4,079,923 | A * | 3/1978 | Kirchner | | B60G 15/12 |
| | | | | | 280/5.515 |
| 4,238,128 | A * | 12/1980 | McKee | | B60G 17/052 |
| | | | | | 280/124.16 |
| 4,390,188 | A * | 6/1983 | Rouse | | B60G 17/056 |
| | | | | | 91/448 |
| 4,397,477 | A * | 8/1983 | Harrison | | B60G 17/056 |
| | | | | | 280/124.161 |
| 4,463,969 | A * | 8/1984 | Harrison | | B60G 17/0152 |
| | | | | | 280/DIG. 1 |
| 4,508,012 | A * | 4/1985 | Reynolds | | B60G 17/056 |
| | | | | | 280/DIG. 1 |
| 4,593,931 | A * | 6/1986 | Shiratori | | B60G 17/04 |
| | | | | | 180/41 |
| 4,715,180 | A * | 12/1987 | Rosman | | B66D 1/08 |
| | | | | | 60/489 |
| 4,840,544 | A * | 6/1989 | Kuromitsu | | F04B 1/0533 |
| | | | | | 137/513.3 |
| 4,911,470 | A * | 3/1990 | Fukunaga | | B60G 17/0152 |
| | | | | | 188/266.2 |
| 4,957,309 | A * | 9/1990 | Komazawa | | B60G 17/04 |
| | | | | | 280/5.513 |
| 4,971,353 | A * | 11/1990 | Buma | | B60G 17/04 |
| | | | | | 280/5.514 |
| 5,020,826 | A * | 6/1991 | Stecklein | | B60G 17/04 |
| | | | | | 280/124.16 |
| 5,024,459 | A * | 6/1991 | Kokubo | | B60G 17/016 |
| | | | | | 280/124.159 |
| 5,160,161 | A | 11/1992 | Tsukamoto et al. | | |
| 5,199,854 | A * | 4/1993 | Aoyama | | B60G 17/018 |
| | | | | | 417/292 |
| 5,342,080 | A | 8/1994 | Machida | | |
| 5,374,167 | A * | 12/1994 | Merbold | | B60T 8/34 |
| | | | | | 417/446 |
| 5,388,811 | A * | 2/1995 | Marjoram | | B62D 33/0608 |
| | | | | | 267/140.13 |
| 5,443,283 | A * | 8/1995 | Hawkins | | B60G 17/0152 |
| | | | | | 280/124.16 |
| 5,467,595 | A * | 11/1995 | Smith | | B60G 17/052 |
| | | | | | 280/124.16 |
| 5,601,307 | A * | 2/1997 | Heyring | | B60G 21/06 |
| | | | | | 701/37 |
| 5,682,980 | A * | 11/1997 | Reybrouck | | B60G 17/04 |
| | | | | | 280/124.16 |
| 5,735,540 | A * | 4/1998 | Schiffler | | B60G 17/0185 |
| | | | | | 280/124.157 |
| 5,785,344 | A * | 7/1998 | Vandewal | | B60G 17/0152 |
| | | | | | 280/124.112 |
| 5,934,422 | A * | 8/1999 | Steed | | F16F 9/46 |
| | | | | | 188/299.1 |
| 5,950,427 | A * | 9/1999 | Demerjian, Jr. | | F15B 15/065 |
| | | | | | 92/138 |
| 6,039,326 | A * | 3/2000 | Agner | | B60G 17/0162 |
| | | | | | 280/5.506 |
| 6,145,860 | A * | 11/2000 | Yu | | B60G 17/0408 |
| | | | | | 280/124.159 |
| 6,196,555 | B1 * | 3/2001 | Gaibler | | B60G 17/018 |
| | | | | | 280/6.154 |
| 6,296,235 | B1 * | 10/2001 | Dalal | | F16F 9/512 |
| | | | | | 267/64.16 |
| 6,305,673 | B1 * | 10/2001 | Delorenzis | | F16F 5/00 |
| | | | | | 188/284 |
| 6,389,341 | B1 * | 5/2002 | Davis | | B60G 21/067 |
| | | | | | 188/274 |
| 6,662,559 | B1 * | 12/2003 | Cook | | F15B 15/18 |
| | | | | | 60/478 |
| 7,055,832 | B2 * | 6/2006 | Germain | | B60G 17/0162 |
| | | | | | 280/5.511 |
| 7,234,707 | B2 * | 6/2007 | Green | | B60G 21/0555 |
| | | | | | 280/124.16 |
| 7,487,973 | B1 * | 2/2009 | Kesselgruber | | B60G 21/073 |
| | | | | | 280/5.506 |
| 7,770,902 | B1 * | 8/2010 | Davis | | B60G 3/145 |
| | | | | | 180/9.5 |
| 7,860,622 | B2 * | 12/2010 | Hashiba | | B60G 17/018 |
| | | | | | 701/37 |
| 8,204,650 | B2 * | 6/2012 | Kesselgruber | | B60G 21/10 |
| | | | | | 701/38 |
| 8,234,860 | B2 * | 8/2012 | Beschorner | | E02F 9/2271 |
| | | | | | 60/329 |
| 8,348,635 | B2 * | 1/2013 | Yamashita | | F04C 2/18 |
| | | | | | 417/205 |
| 8,356,630 | B2 * | 1/2013 | Stretch | | F15B 13/0832 |
| | | | | | 251/64 |
| 8,448,432 | B2 * | 5/2013 | Bresie | | F15B 7/006 |
| | | | | | 92/113 |
| 8,672,337 | B2 * | 3/2014 | van der Knaap | | B60G 17/0152 |
| | | | | | 280/124.16 |
| 8,820,064 | B2 * | 9/2014 | Six | | B60G 17/08 |
| | | | | | 60/475 |
| 8,876,133 | B2 * | 11/2014 | Ellifson | | F16F 9/0281 |
| | | | | | 280/124.157 |
| 8,905,071 | B2 * | 12/2014 | Coombs | | F15B 13/0853 |
| | | | | | 137/884 |
| 8,984,873 | B2 * | 3/2015 | Opdenbosch | | E02F 9/2296 |
| | | | | | 60/420 |
| 9,057,389 | B2 * | 6/2015 | Opdenbosch | | F15B 11/16 |
| 9,068,578 | B2 * | 6/2015 | Opdenbosch | | F15B 13/06 |
| 9,091,281 | B2 * | 7/2015 | Quinnell | | E02F 9/2282 |
| 9,108,484 | B2 * | 8/2015 | Reybrouck | | B60G 15/063 |
| 9,272,598 | B2 * | 3/2016 | Kazmirski | | B60G 17/0272 |
| 9,323,253 | B2 * | 4/2016 | Dybing | | F15B 11/0423 |
| 9,352,633 | B2 | 5/2016 | Kim | | |
| 9,382,923 | B2 * | 7/2016 | Carlin | | F15B 11/0445 |
| 9,481,221 | B2 * | 11/2016 | Reybrouck | | F16F 9/46 |
| 9,574,579 | B2 * | 2/2017 | Dybing | | F15B 11/17 |
| 9,574,582 | B2 * | 2/2017 | Edmonson | | F15B 1/26 |
| 9,616,866 | B2 * | 4/2017 | Iyatani | | B60T 13/686 |
| 9,702,349 | B2 * | 7/2017 | Anderson | | B60G 17/052 |
| 9,758,143 | B2 * | 9/2017 | Ohnishi | | B60T 8/4081 |
| 9,834,056 | B2 * | 12/2017 | Coombs | | F15B 13/0853 |
| 10,358,010 | B2 * | 7/2019 | Boon | | B60G 21/06 |
| 10,434,835 | B2 * | 10/2019 | Six | | F15B 13/027 |
| 10,557,512 | B2 * | 2/2020 | Förster | | F16F 9/325 |
| 10,626,996 | B2 * | 4/2020 | Voss | | F16F 9/34 |
| 10,656,669 | B2 * | 5/2020 | Dawson | | F04B 11/005 |
| 10,807,468 | B1 * | 10/2020 | Buescher | | F16H 57/10 |

(56) References Cited

U.S. PATENT DOCUMENTS

| | | | | |
|---|---|---|---|---|
| 10,865,788 B2* | 12/2020 | Afshari | | F04C 2/18 |
| 10,882,374 B2* | 1/2021 | Coombs | | B60G 17/0523 |
| 11,035,433 B2* | 6/2021 | Rong | | F16F 9/34 |
| 11,059,342 B2* | 7/2021 | Birch | | B60G 17/0195 |
| 11,084,350 B2* | 8/2021 | Birch | | B60G 15/06 |
| 11,091,000 B2* | 8/2021 | Birch | | B60G 15/06 |
| 11,268,508 B2* | 3/2022 | Miyazawa | | F04C 14/12 |
| 11,433,730 B2* | 9/2022 | Kawai | | B60G 17/015 |
| 11,518,357 B2* | 12/2022 | Reuter | | B60T 13/686 |
| 11,679,820 B2* | 6/2023 | Streit | | B60G 99/002 |
| | | | | 280/124.106 |
| 11,691,474 B2* | 7/2023 | Boon | | B60G 21/067 |
| | | | | 141/1 |
| 11,697,318 B2* | 7/2023 | Stabenow | | F04B 49/08 |
| | | | | 137/2 |
| 11,697,319 B2* | 7/2023 | Vandersmissen | | B60G 17/056 |
| | | | | 280/5.514 |
| 11,708,878 B2* | 7/2023 | Marking | | F16F 9/468 |
| | | | | 188/266.2 |
| 11,788,256 B2* | 10/2023 | Vanderlaan | | E02F 9/2292 |
| | | | | 60/421 |
| 11,788,598 B2* | 10/2023 | Ono | | F16F 9/19 |
| | | | | 188/317 |
| 2004/0145100 A1* | 7/2004 | Delorenzis | | B60G 17/0152 |
| | | | | 267/64.28 |
| 2008/0224428 A1* | 9/2008 | Smith | | B60G 17/0185 |
| | | | | 280/5.514 |
| 2008/0230337 A1* | 9/2008 | Kajiyama | | B60T 13/686 |
| | | | | 188/352 |
| 2008/0257626 A1* | 10/2008 | Carabelli | | B60G 13/14 |
| | | | | 180/165 |
| 2009/0032746 A1* | 2/2009 | Smith | | F15B 13/0433 |
| | | | | 251/30.02 |
| 2009/0192674 A1* | 7/2009 | Simons | | B60G 17/021 |
| | | | | 701/37 |
| 2010/0072760 A1* | 3/2010 | Anderson | | B60G 13/14 |
| | | | | 290/1 R |
| 2010/0119393 A1* | 5/2010 | Osswald | | F04B 23/026 |
| | | | | 417/521 |
| 2015/0086405 A1* | 3/2015 | Konakawa | | F04C 2/24 |
| | | | | 418/191 |
| 2016/0102686 A1* | 4/2016 | An | | F15B 21/14 |
| | | | | 60/430 |
| 2017/0174195 A1* | 6/2017 | Sagayama | | H02K 7/116 |
| 2018/0209524 A1* | 7/2018 | Dodson | | B60T 10/04 |
| 2021/0197639 A1 | 7/2021 | Bauer et al. | | |
| 2023/0111977 A1* | 4/2023 | Boon | | B60G 17/01908 |
| | | | | 701/37 |
| 2023/0150329 A1* | 5/2023 | Coombs | | F15B 13/0814 |
| | | | | 280/124.16 |

FOREIGN PATENT DOCUMENTS

| | | |
|---|---|---|
| DE | 4003493 A1 | 8/1991 |
| DE | 102018001797 A1 | 9/2019 |
| EP | 0017351 A1 | 10/1980 |
| EP | 0039573 A2 | 11/1981 |
| EP | 0844117 B1 | 10/2002 |
| EP | 3396159 A1 | 10/2018 |
| FR | 1189006 A | 9/1959 |
| JP | 55139506 A | 10/1980 |
| JP | 63184110 U | 11/1988 |
| JP | 5040936 B2 | 10/2012 |
| WO | 2020113287 A1 | 6/2020 |

OTHER PUBLICATIONS

First Office Action issued for corresponding Japanese Patent Application 2022-058917 issued on May 9, 2023.

Extended European Search Report issued on Jul. 26, 2022 for counterpart European patent application No. 22162129.5.

* cited by examiner

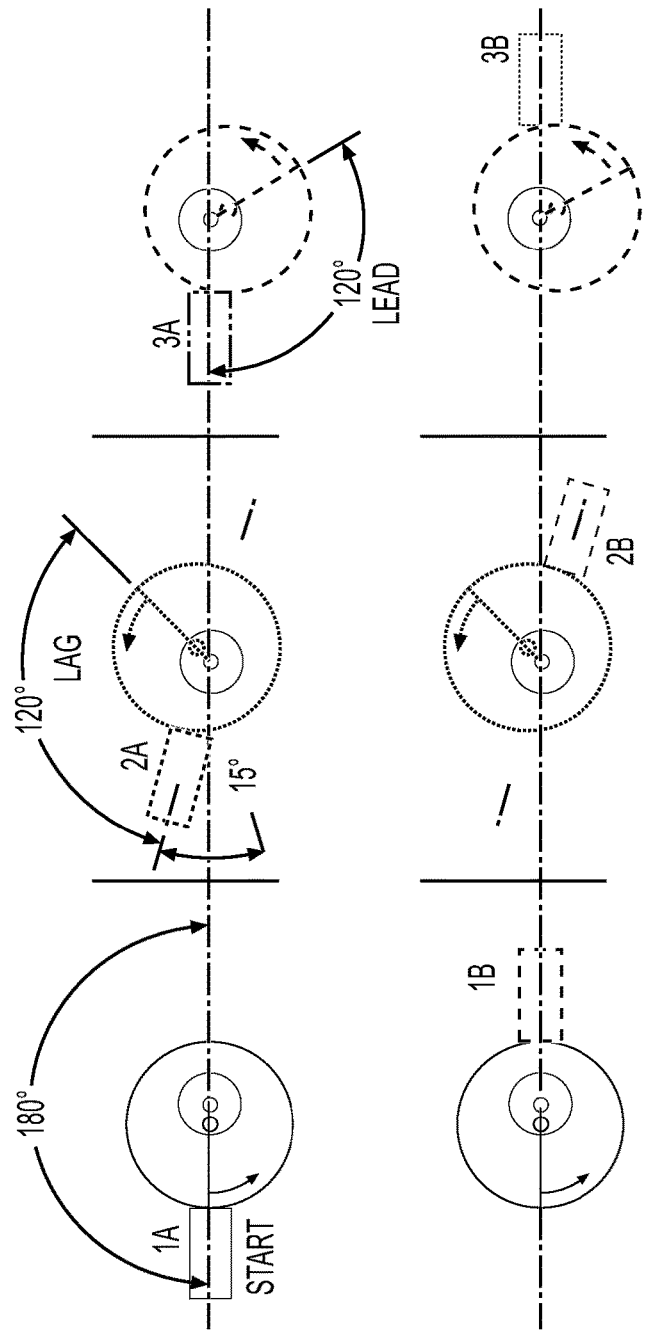
FIG. 9
FIG. 10B
FIG. 10A

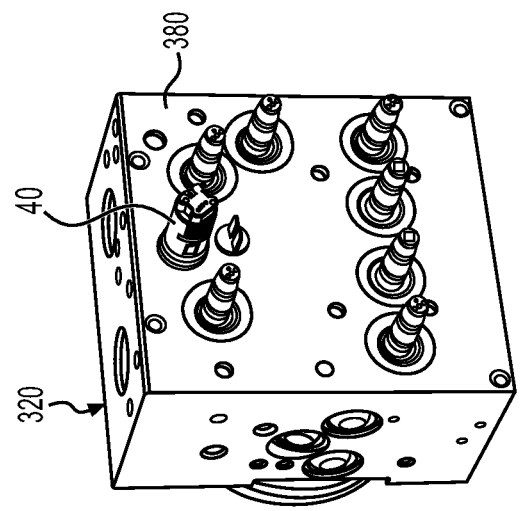
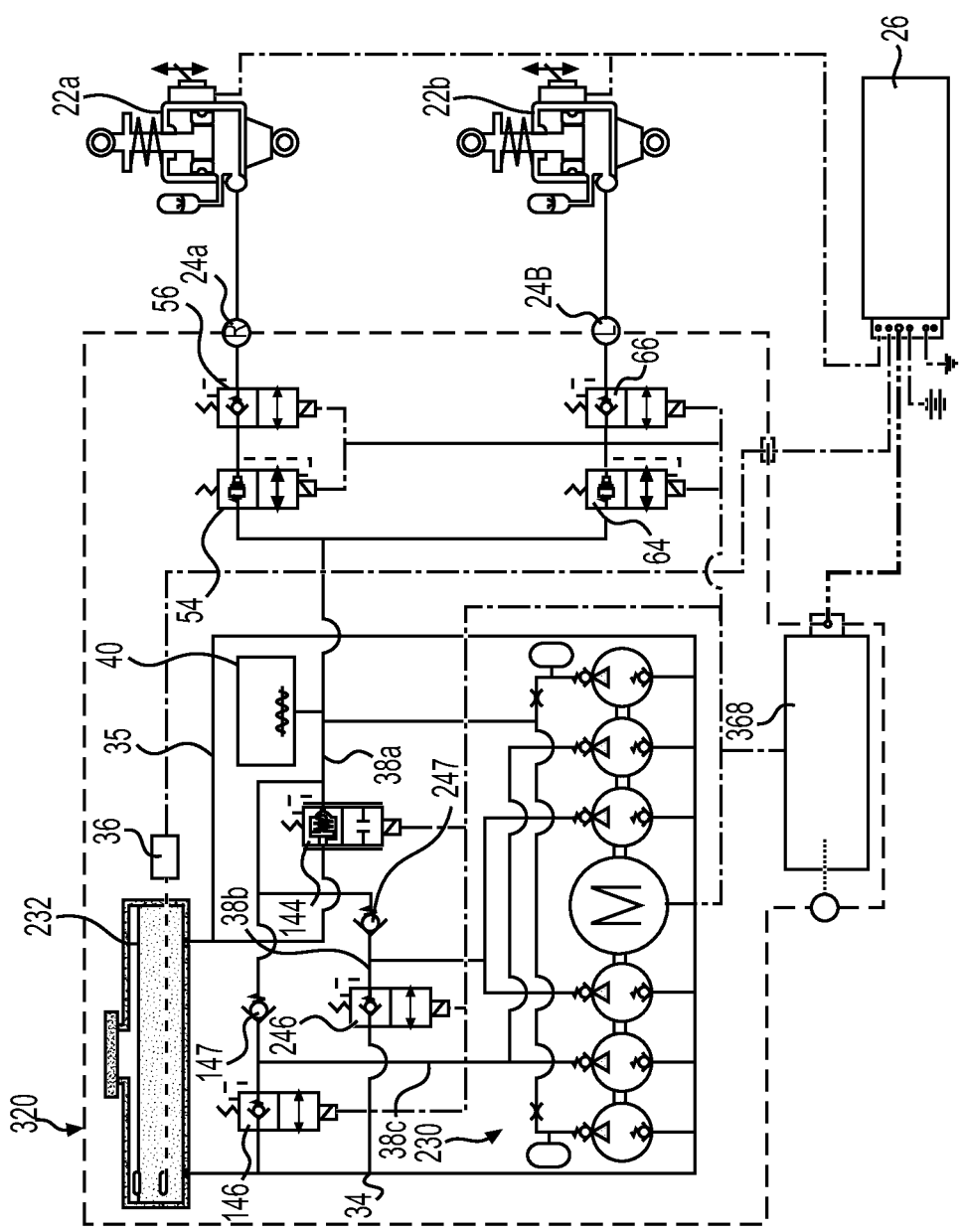
FIG. 24
FIG. 23

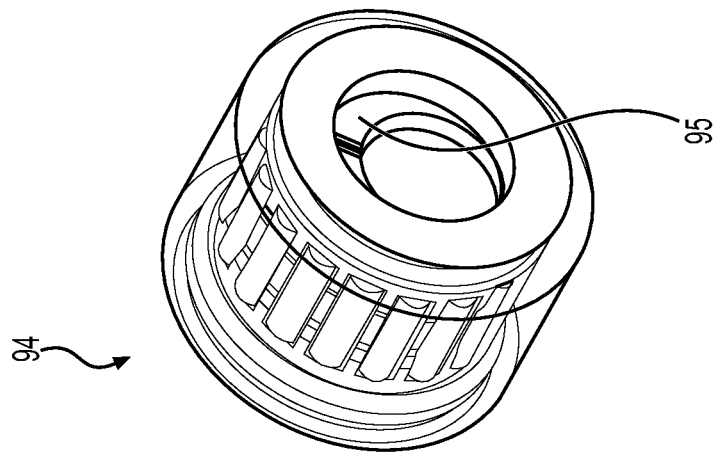
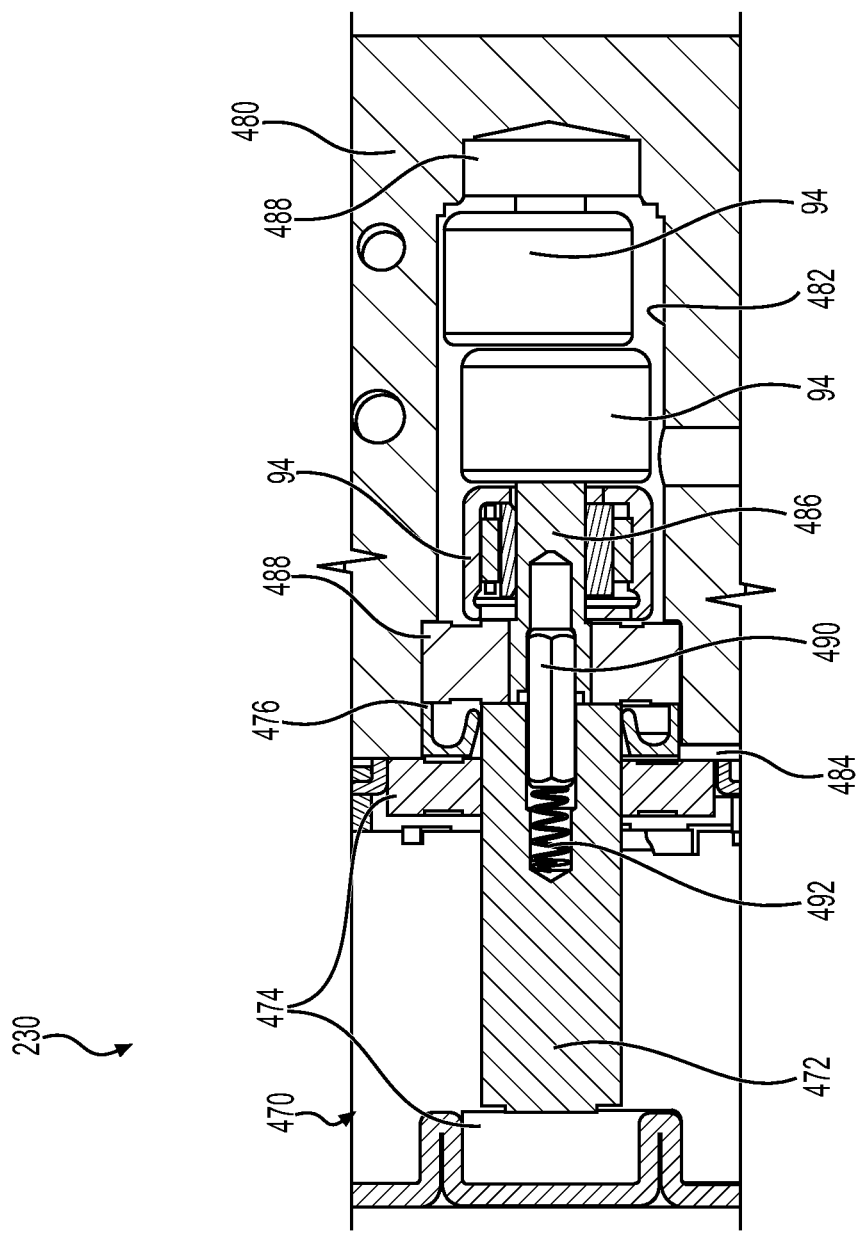
FIG. 36
FIG. 35

SUSPENSION HYDRAULIC LIFT ACTUATOR FOR AXLE TRIM HEIGHT CONTROL

CROSS REFERENCE TO RELATED APPLICATIONS

This U.S. utility patent application claims the benefit of U.S. Provisional Patent Application No. 63/168,592 filed Mar. 31, 2021 and Chinese Patent Application No. 202210157290.5 filed Feb. 21, 2022, the contents of which are incorporated herein by reference in their entirety.

BACKGROUND OF THE INVENTION

1. Field of the Invention

The present disclosure relates generally to a system for controlling suspension height of a vehicle.

2. Related Art

Conventional systems for controlling suspension height of a vehicle have used hydraulic cylinders with an all-hydraulic system, or air springs or air-filled dampers as an all-pneumatic system to control the ride height of a vehicle.

SUMMARY OF THE INVENTION

The present disclosure provides a hydraulic actuator for a vehicle suspension, comprising: a pump assembly including an electric motor coupled to a pump and configured to transfer hydraulic fluid to a discharge header; a first isolation valve having an elastomeric seat and configured to selectively block fluid flow from a port in fluid communication with a height-adjustable damper to the discharge header; and a second isolation valve having a metal seat and connected in series with the first isolation valve to selectively block fluid flow from the port to the discharge header.

The present disclosure also provides a hydraulic actuator for a vehicle suspension, comprising: a pump assembly including an electric motor coupled to a first pump and a second pump, the first pump configured to transfer hydraulic fluid from a supply fluid passage to a first discharge header, and the second pump configured to transfer hydraulic fluid from the supply fluid passage to a second discharge header; and a bypass recirculation valve configured to selectively control fluid flow from the second discharge header to at least one of the supply fluid passage or a fluid reservoir in fluid communication with the supply fluid passage.

The present disclosure also provides a hydraulic actuator for a vehicle suspension, comprising: a body; a pump assembly including an electric motor configured to displace a piston within the body; and a valve arrangement having at least one solenoid valve for selectively controlling fluid flow from the pump assembly to at least one port for providing hydraulic fluid to a height-adjustable damper. The valve arrangement and the pump assembly are arranged at least partially inside the body. The electric motor is arranged on a first face of the body, and the valve arrangement is arranged on a second face of the body that is opposite the first face, wherein the first and second faces directly face each other.

The present disclosure also provides a suspension hydraulic lift system and a suspension hydraulic lift actuator comprising any feature described, either individually or in combination with any feature, in any configuration.

BRIEF DESCRIPTION OF THE DRAWINGS

Further details, features and advantages of designs of the invention result from the following description of embodiment examples in reference to the associated drawings.

FIG. 9 is a diagram showing relative positions of pistons in a pump assembly of the SHLA assembly of FIG. 8;

FIG. 10A is a top view showing positions of the pistons in the pump assembly of the SHLA assembly of FIG. 8;

FIG. 10B is an end view showing positions of the pistons in the pump assembly of the SHLA assembly of FIG. 8;

FIG. 23 shows a schematic diagram of a SHLA assembly in accordance with a fourth embodiment of the present disclosure;

FIG. 24 shows a perspective view of the SHLA assembly of FIG. 23, without the EDC installed;

FIG. 35 shows a cross-section of a pump assembly of some embodiments of the present disclosure;

FIG. 36 shows a perspective view of an eccentric bearing of a pump assembly of some embodiments of the present disclosure.

DESCRIPTION OF THE ENABLING EMBODIMENTS

Figure 1:
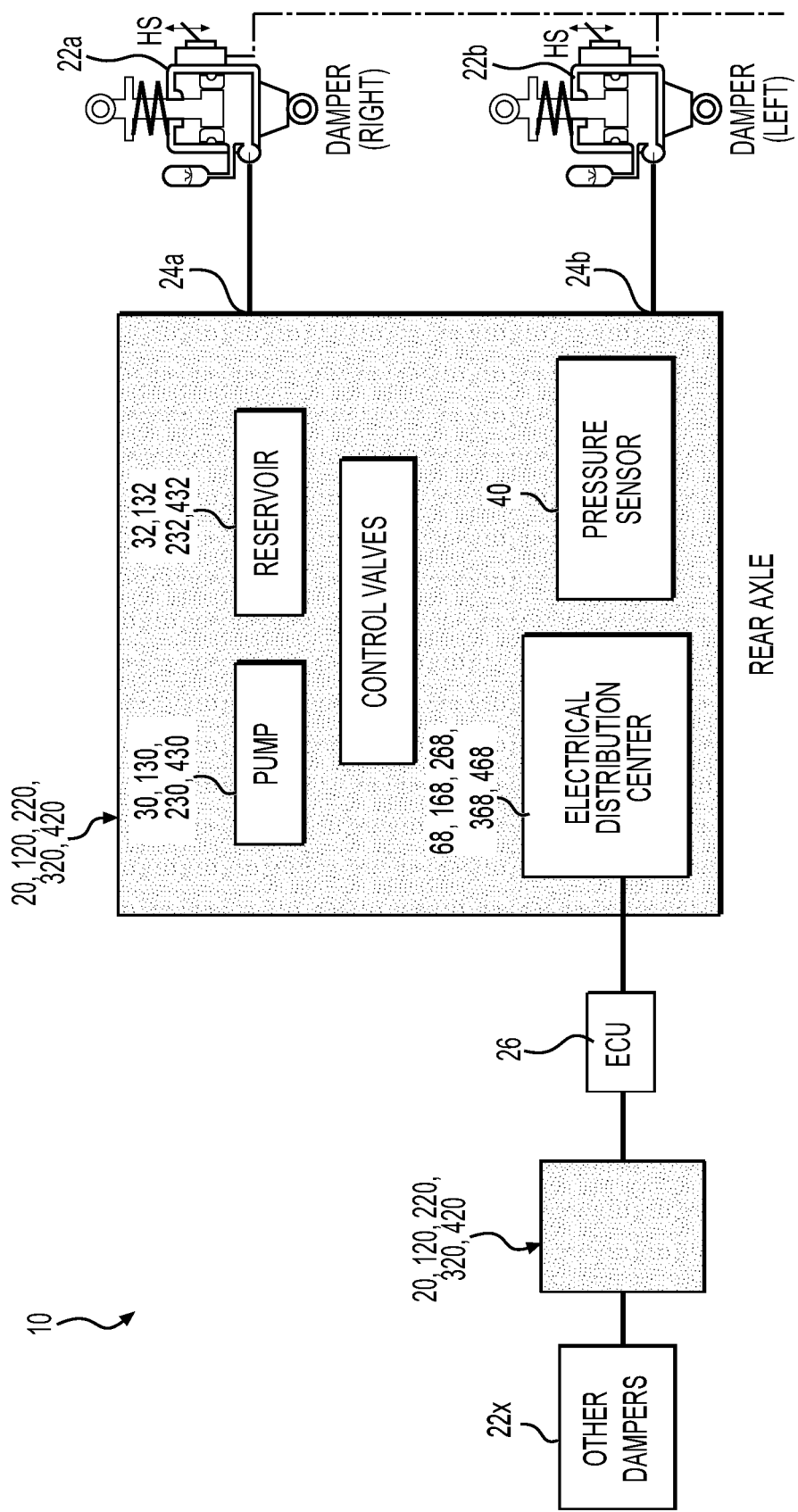
FIG. 1 shows a block diagram of a suspension hydraulic lift system of the present disclosure.

Referring to the drawings, the present invention will be described in detail in view of following embodiments. This disclosure provides a new way to implement controlling the suspension height of a vehicle using hydraulics rather than a traditional pneumatic system. In this system design the suspension trim height is determined by the pressure supplied to the specially designed dampers. The higher the pressure, the higher the vehicle will be lifted. The actuators of the present disclosure each supply hydraulic power to one or more specially designed hydro-pneumatic dampers to raise or lower each corner of the vehicle either totally independently or axle independently.

Several different embodiments of actuator assemblies are provided, and the design can be tailored to specific customer needs of performance, packaging, and cost. The actuator assemblies of the present disclosure are designed to supply fluid to two of the dampers on a specific vehicle axle. However, the principals of the present disclosure may be applied to actuator assemblies configured to supply fluid to any number of dampers in any configuration on a vehicle. In some embodiments, the actuator assembly is configured to meet a design requirement that the hydraulics be totally leak free at a given minimum support pressure, such as 20+ bar.

FIG. 1 shows a block diagram of a suspension hydraulic lift system 10 for raising and lowering a vehicle, such as a car or truck. The suspension hydraulic lift system 10 includes a suspension hydraulic lift actuator (SHLA) assembly 20, 120, 220, 320, 420 configured to supply and to control a supply of hydraulic fluid under pressure to one or more height-adjustable dampers via corresponding fluid supply ports 24a, 24b on the SHLA assembly 20, 120, 220, 320, 420. In the provided embodiments, the SHLA assembly 20, 120, 220, 320, 420 is configured to supply and to control a supply of hydraulic fluid under pressure to each of two height-adjustable dampers 22a, 22b. The height-adjustable dampers 22a, 22b include a right-side damper 22a fluidly coupled to the SHLA assembly 20, 120, 220, 320, 420 via a right-side fluid supply port 24a. The height-adjustable dampers 22a, 22b also include a left-side damper 22b fluidly coupled to the SHLA assembly 20, 120, 220, 320, 420 via a left-side fluid supply port 24b. Each of the height-adjustable dampers 22a, 22b has a height sensor HS attached thereto. Each of the height-adjustable dampers 22a, 22b may be connected to a corresponding side of a common axle of the vehicle. An electronic control unit (ECU) 26 such as a body control module (BCM) of the vehicle includes one or more processors to control operation of the SHLA assembly 20, 120, 220, 320, 420. FIG. 1 only includes the height-adjustable dampers 22a, 22b and details of a SHLA assembly 20, 120, 220, 320, 420 for controlling two of the height-adjustable dampers 22a, 22b on a rear axle of a vehicle. However, the suspension hydraulic lift system 10 may include a similar or identical configuration for controlling a height of the front axle. Additionally or alternatively, an SHLA assembly of the present disclosure may be configured to supply and to control a supply of hydraulic fluid under pressure to any number of the height-adjustable dampers 22a, 22b, such as 22a, 22b, for the rear axle and 22c, 22d (not shown) for the front axle or four of the height-adjustable dampers 22a, 22b or some other number of height-adjustable dampers 22x.

The SHLA assembly 20, 120, 220, 320, 420 includes a pump assembly 30, 130, 230, 430, a fluid reservoir 32, 132, 232, an electrical distribution center 68, 168, 268, 368, 468, and a pressure sensor 40. The SHLA assembly 20, 120, 220, 320, 420 also includes several control valves to control the supply of fluid to and from the height-adjustable dampers 22a, 22b. The number and type of the control valves, as well as the configuration of the control valves, varies between different embodiments, and is described in more detail in subsequent parts of this disclosure.

Figure 2:
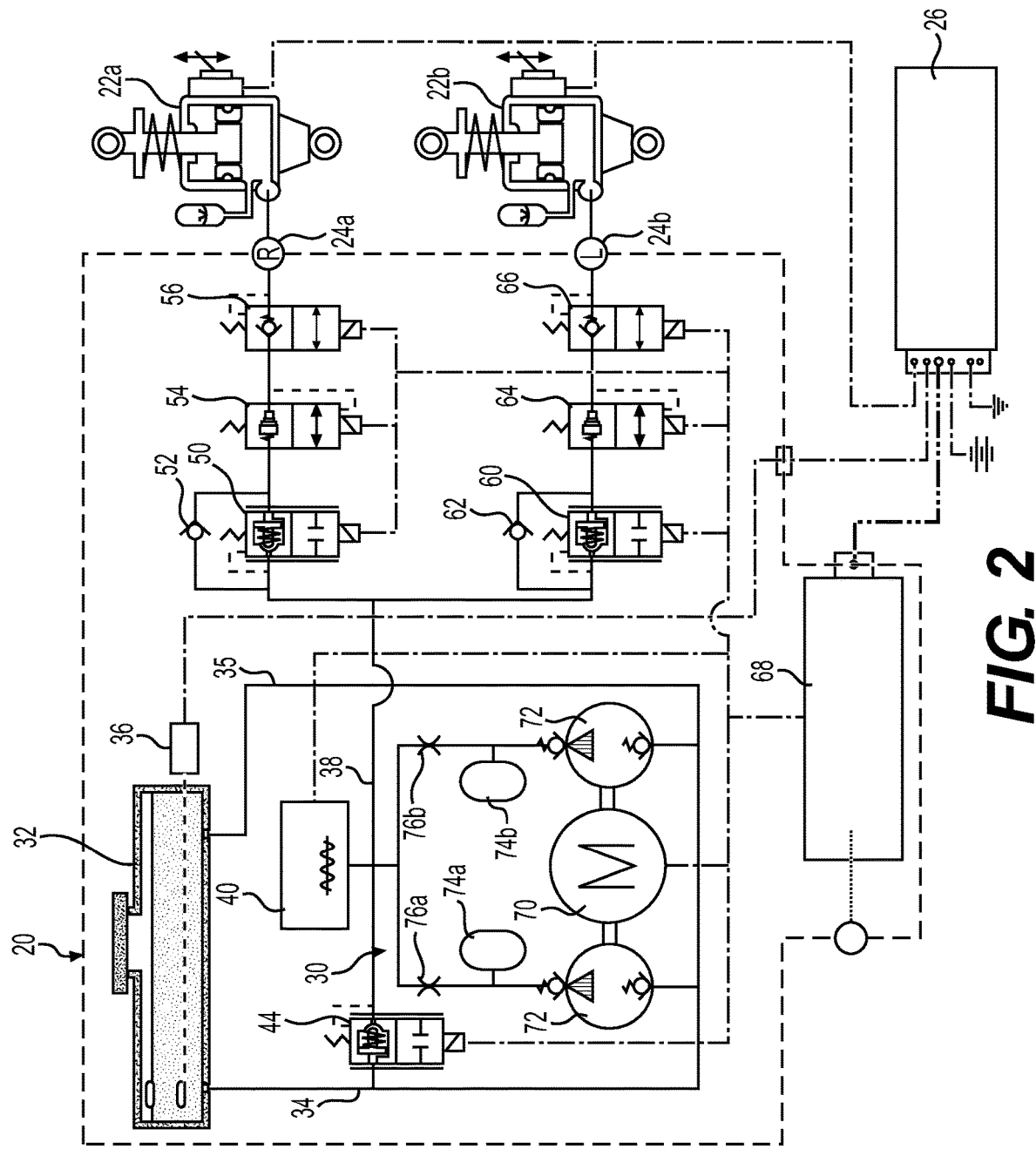
FIG. 2 shows a schematic diagram of a suspension hydraulic lift actuator (SHLA) assembly in accordance with a first embodiment of the present disclosure.

FIG. 2 shows a schematic diagram of a first SHLA assembly 20 in accordance with a first embodiment of the present disclosure. The first SHLA assembly 20 may be characterized as a 7-valve, 2-pump assembly. The first SHLA assembly 20 using existing or slightly modified components, thus providing a variety of advantages including minimizing investment, using components already certified for safety-critical automotive systems, and utilization of existing manufacturing capacity. The first SHLA assembly 20 includes a first pump assembly 30 coupled to a first fluid reservoir 32 via first and second supply fluid passages 34, 35. A level switch 36 monitors a level of fluid within the first fluid reservoir 32. The first pump assembly 30 pumps the fluid from at least one of the supply fluid passages 34, 35 and into a discharge header 38, which may be maintained under pressure. A pressure sensor 40 monitors the pressure and/or temperature of the fluid in the discharge header 38.

A pressure control valve 44 selectively controls fluid flow from the discharge header 38 to one of the supply fluid passages 34, 35. The pressure control valve 44, may thereby control pressure within the discharge header 38. A first set of control valves 50, 54, 56 controls fluid flow between the discharge header 38 and a right-side fluid supply port 24a. The first set of control valves 50, 54, 56 includes a first linear apply control valve 50 connected in series with a first isolation valve 54 having an elastomeric seat and a second isolation valve 56 having a metallic seat. The first linear apply control valve 50 may be a normally-open (NO) solenoid valve. The first and second isolation valves 54, 56 may each be called blocking valves 54, 56. The first and second isolation valves 54, 56 may each be configured as normally-closed (NC) solenoid valves. A first check valve 52 provides for fluid flow around the linear apply control valve 50 from the right-side fluid supply port 24a to the discharge header 38. Similarly, a second set of control valves 60, 64, 66 controls fluid flow between the discharge header 38 and a left-side fluid supply port 26a.

The second set of control valves 60, 64, 66 includes a second linear apply control valve 60 connected in series with a third isolation valve 64 having an elastomeric seat and a fourth isolation valve 66 having a metallic seat. The second linear apply control valve 60 may be a normally-open (NO) solenoid valve. The third and fourth isolation valves 64, 66 may each be called blocking valves 64, 66. The third and fourth isolation valves 64, 66 may each be configured as normally-closed (NC) solenoid valves. A second check valve 62 provides for fluid flow around the second linear apply control valve 60 from the left-side fluid supply port 26a to the discharge header 38.

The first pump assembly 30 includes a first electric motor 70 configured to drive a two first pumping elements 72, thereby pumping fluid from at least one of the supply fluid passages 34, 35 to the discharge header 38. Each of the first pumping elements 72 includes a piston movable through a corresponding bore. However, any or all of the first pumping elements 72 may have a different number of pistons and/or a different pump configuration. In a system with two pumping elements that each include a single piston, there are no overlapping pressure discharge areas to absorb excess noise. So, pump damper orifices 76a, 76b and damper chambers 74a, 74b are connected to discharge ports of each of the first pumping elements 72 to absorb pulses of pressure and to thereby reduce noise produced by operation of the first pump assembly 30.

A first electrical distribution center (EDC) 68 controls electrical power supplied to the pressure control valve 44, the first and second sets of control valves 50, 54, 56, 60, 64, 66, and the first electric motor 70. The first EDC 68 monitors the fluid level in the first fluid reservoir 32 via the level switch 36. The first EDC 68 also monitors the pressure and/or temperature within the discharge header 38 via the pressure sensor 40.

As shown is FIG. 2 there are several key features that make the design of the first SHLA assembly 20 unique for independently controlling the right and left damper assemblies 22a, 22b of a given vehicle axle:

The pressure control valve (PCV) 44 is a normally-open, linear isolation valve. By using precise current control to actuate the PCV 44, system back pressure can be accurately controlled.

The second isolation valve 56 and the fourth isolation valve 66 may be normally-closed solenoid valves having metallic seats, which may be "near zero leak." These valves 56, 66 provide the corner-to-corner fluid isolation and minimize the number of pump high pressure replenishment cycles.

The first isolation valve 54 and the third isolation valve 64 may be normally-closed solenoid valves having elastomeric seats. Since these valves have elastomeric seats, system pressure can be maintained at 20 bar or greater, eliminating long-term leak-down.

The linear apply control valves 50, 60 may be normally-open linear apply solenoid valves, providing for individual flow control for individually balancing the right-side damper 22a and the left-side damper 22b.

The electronic distribution center (EDC) 68 collects all the electrical leads from the various components so that the vehicle electronic control unit (ECU-V) 26 can be conveniently connected to the SHLA.

The pressure sensor 40 can monitor both pressure and temperature to provide feedback for calculated vs actual pump performance and as a diagnostic aid for overall system performance.

Figure 3A:
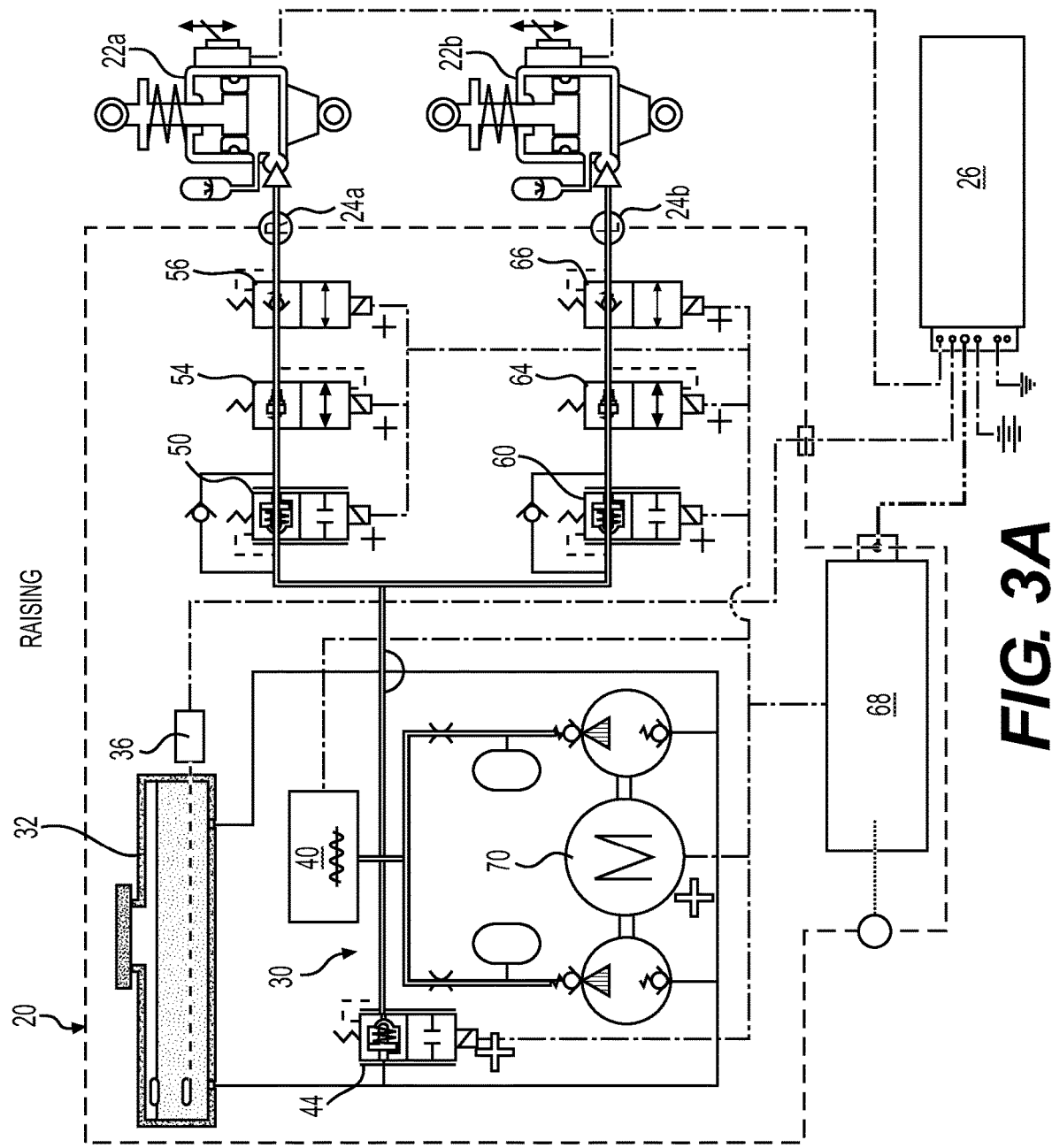
FIG. 3A shows a schematic diagram of the SHLA assembly of FIG. 2 in a raising mode, indicating a flow path of fluid for raising the vehicle.

FIG. 3A shows a schematic diagram of the first SHLA assembly 20 of FIG. 2 in a raising mode, indicating a flow path of fluid for raising the vehicle. To raise the trim height of the vehicle the first electric motor 70 is turned on, the PCV 44 is held fully or partially closed to adjust overall pump flow rates, the four Normally Closed Valves 54, 56, 64, 66 are energized to permit flow and the Normally Open Damper Control Valves 50, 60 may be left off (fully open) or partially closed by applying a proportional current) to control left and right flow division to a corresponding one of the height-adjustable dampers 22a, 22b.

Figure 3B:
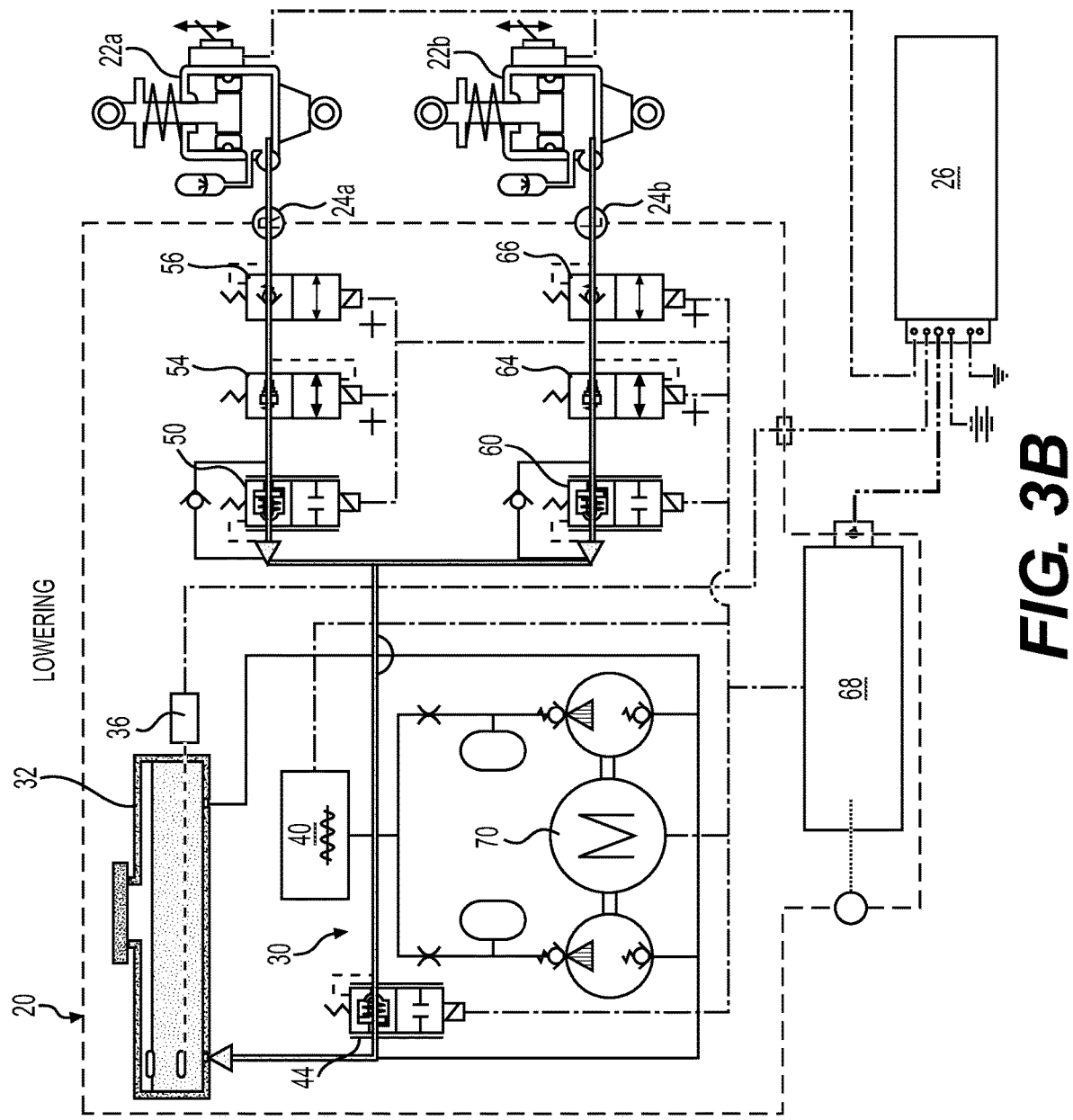
FIG. 3B shows a schematic diagram of the SHLA assembly of FIG. 2 in a lowering mode, indicating a flow path of fluid for lowering the vehicle.

FIG. 3B shows a schematic diagram of the first SHLA assembly 20 of FIG. 2 in a lowering mode, indicating a flow path of fluid for lowering the vehicle. To lower the trim height of the vehicle the four normally-closed valves 54, 56, 64, 66 are energized to permit flow and the linear apply control valves 50, 60 are off (fully open) as the check valves 52 and 62 permit full bypass flow to the discharge header 38. The PCV 44 may be fully open or partially applied to control discharge flow rate back to the first fluid reservoir 32.

Figure 3C:
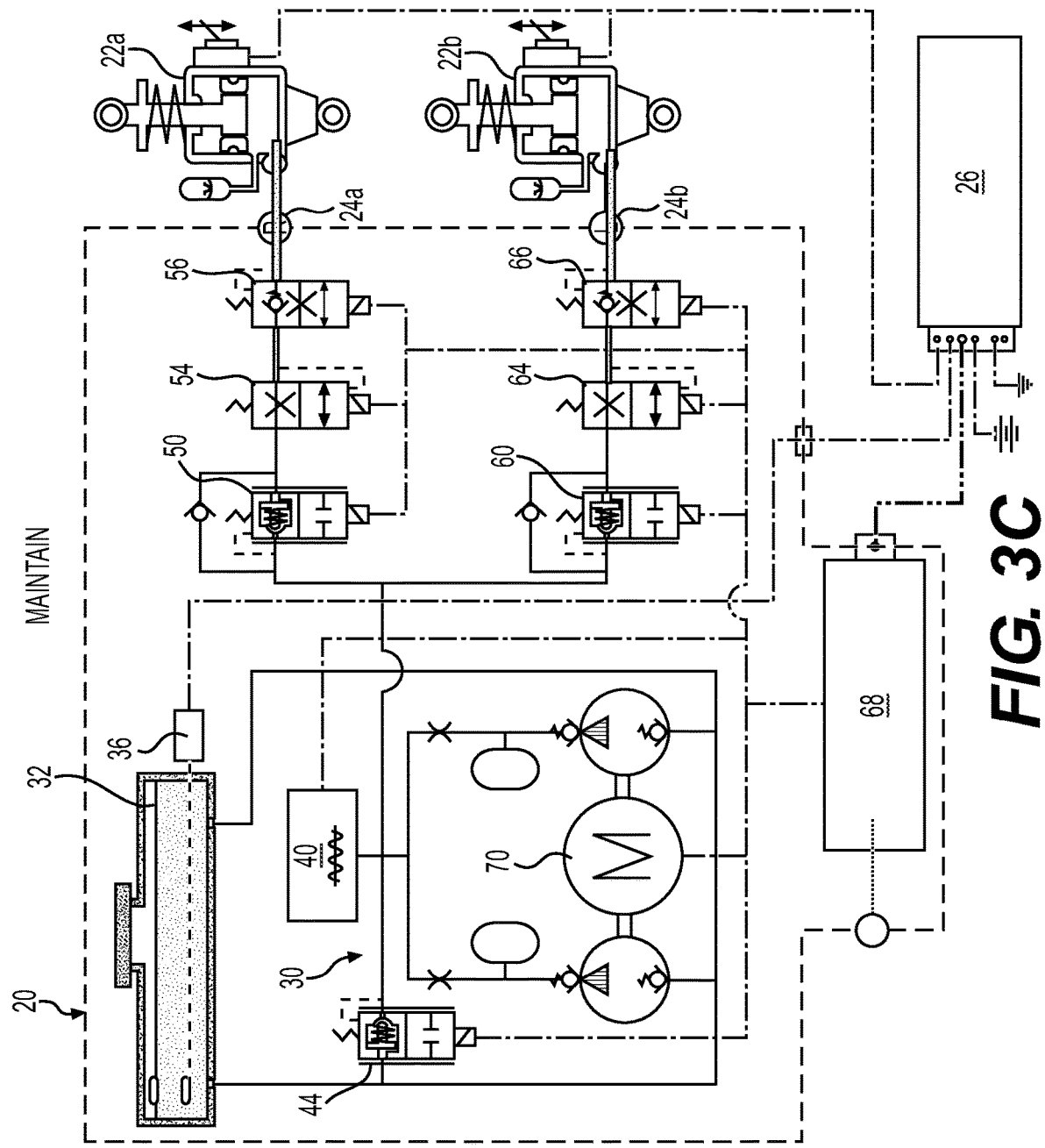
FIG. 3C shows a schematic diagram of the SHLA assembly of FIG. 2 in a maintaining mode, indicating a flow path of fluid for maintaining a height of the vehicle.

FIG. 3C shows a schematic diagram of the first SHLA assembly 20 in a maintaining mode, indicating a flow path of fluid for maintaining a height of the vehicle. There are two main considerations to take into account. One is that at high maintenance pressures it is desirable to have minimal leakage. The other, at pressures below twenty (20) bar, the leak rate requirement is zero, only achievable with an elastomeric seat. So, a near zero leak metallic valve (pro-seal) 56, 66 is used in series with an elastomeric sealed valve (counter-seal) 54, 64 to prevent over stressing of parts.

Figure 4C:
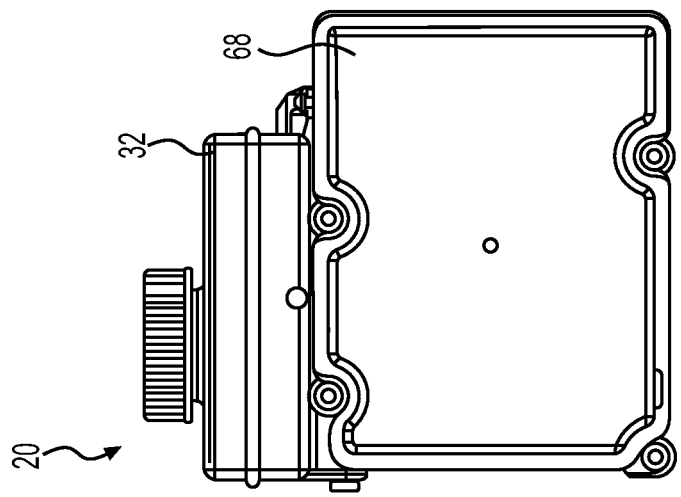
FIG. 4C shows a profile side view of the SHLA assembly of FIG. 2.
Figure 4B:
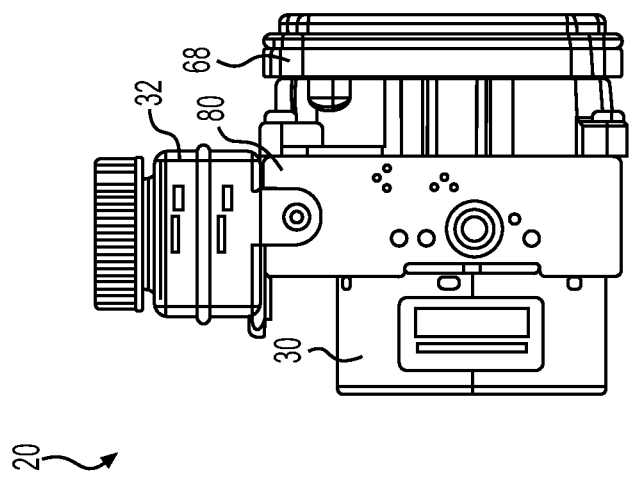
FIG. 4B shows a front-side view of the SHLA assembly of FIG. 2.
Figure 4A:
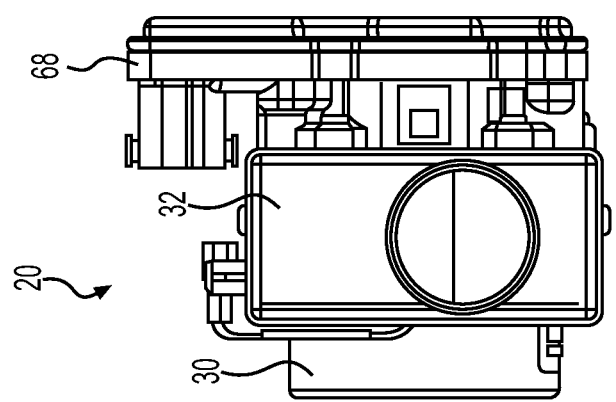
FIG. 4A shows a top view of the SHLA assembly of FIG. 2.

FIGS. 4A-4C show various views of the first SHLA assembly 20. The first SHLA assembly 20, with its 7-Valve, 2-Pump design provides a very compact package. The 2-pump, transverse motor with single eccentric bearing is commonly used for other applications, such as in stability control systems.

Figure 5B:
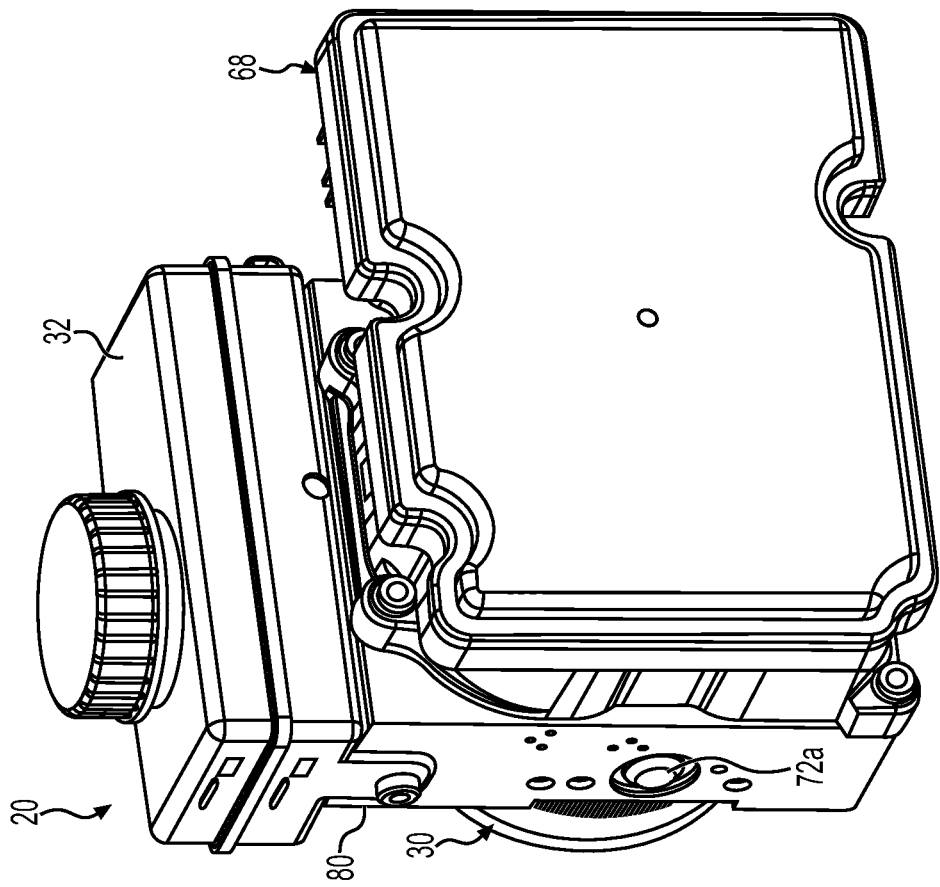
FIG. 5B shows a perspective view of the SHLA assembly of FIG. 2, with the EDC in place.
Figure 5A:
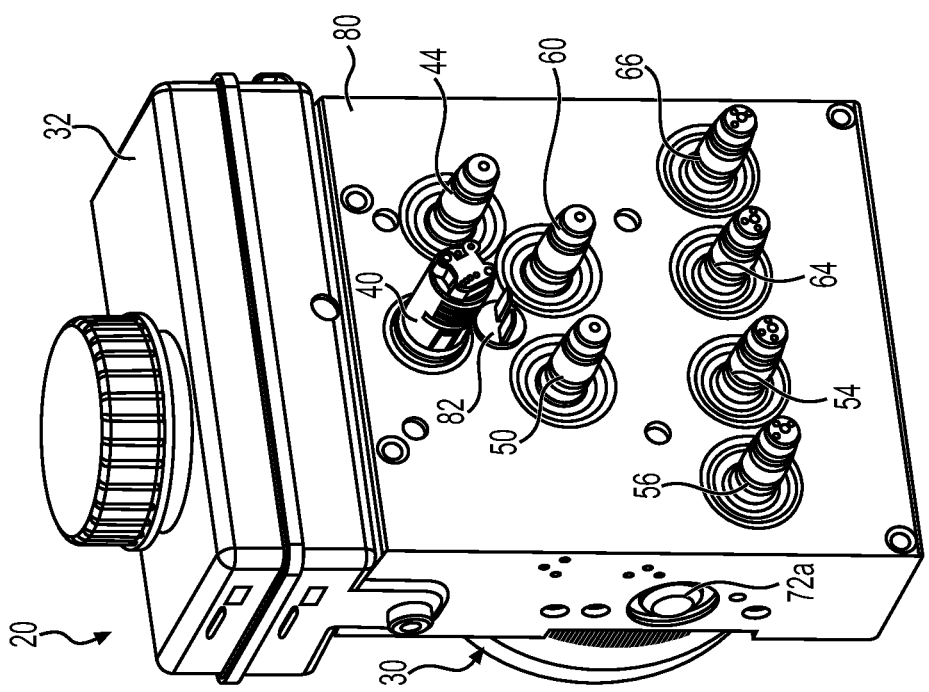
FIG. 5A shows a perspective view of the SHLA assembly of FIG. 2, without the electrical distribution center (EDC) installed.

FIG. 5A shows a perspective view of the first SHLA assembly 20, including a first hydraulic control unit (HCU) body 80 having a rectangular shape including two large square faces on opposite sides, and with the first fluid reservoir 32 mounted to a top side edge, and without the first EDC 68 installed. Valve stems of the pressure control valve 44, and each of the first and second sets of control valves 50, 54, 56, 60, 64, 66 each protrude out of a common face of the first HCU body 80. The pressure sensor 40 and a set of power leads 82 for supplying power to the first electric motor 70 each also protrude out of the same common face of the first HCU body 80. Thus, the pressure sensor 40, and the first electric motor 70 can be electrically connected to corresponding terminals of the first EDC 68 by simply attaching the first EDC 68 onto the common face of the first HCU body 80. Likewise, the first EDC 68 may include solenoid coils aligned with the stems of each of the pressure control valve 44, and the control valves 50, 54, 56, 60, 64, 66 for operating those valves with the first EDC 68 mounted on the common face of the first HCU body 80.

Figure 5C:
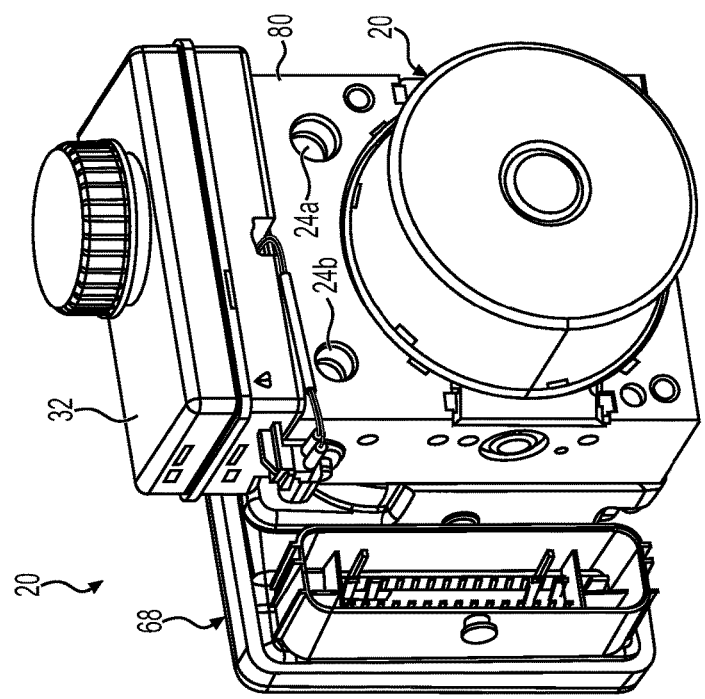
FIG. 5C shows another perspective view of the SHLA assembly of FIG. 2, showing attachment of the pump assembly.

FIG. 5B shows a perspective view of the first SHLA assembly 20, with the first EDC 68 in place. FIG. 5C shows another perspective view of the first SHLA assembly 20, showing attachment of the first pump assembly 30 on a face of the first HCU 80 opposite the mounting of the first EDC 68.

Figure 6:
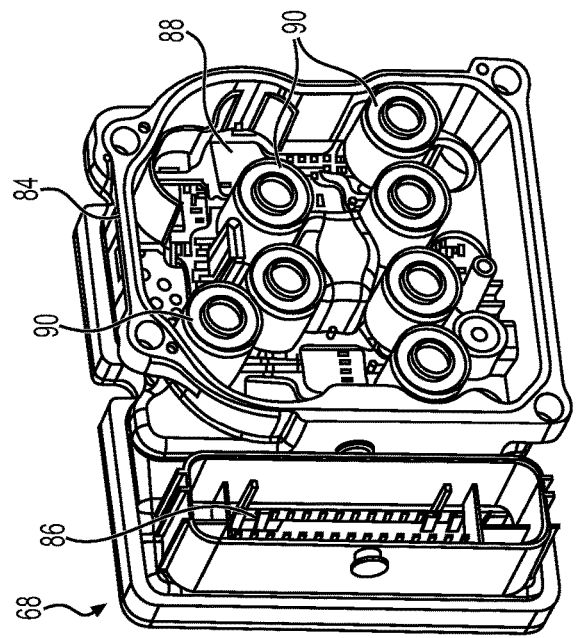
FIG. 6 shows a perspective view of the EDC of the SHLA assembly of FIG. 2.

FIG. 6 shows a perspective view of the EDC 68 of the first SHLA assembly 20. The EDC 68 includes a housing 84 holding a wiring connector 86 for plugging-in a wiring cable for connection to the ECU 26. The EDC 68 also includes a printed circuit board (PCB) 88 for holding and providing electrical communication between the various electrical components and the wiring connector 86. A plurality of solenoid coils 90 are located on the PCB 88 for operating the control valves 44, 50, 54, 56, 60, 64, 66. The PCB 88 may also include connectors for electrically connecting the power leads 82 of the first electric motor 70 and the pressure sensor 40 to the wiring connector 86.

Figure 7:
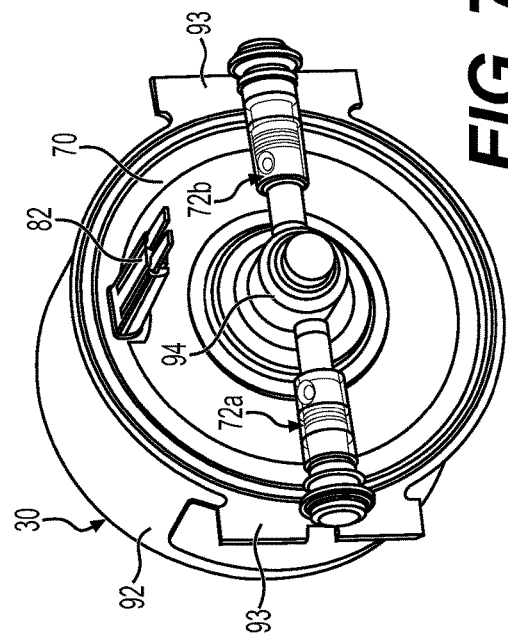
FIG. 7 shows a perspective view of the pump assembly of the SHLA assembly of FIG. 2.

FIG. 7 shows a perspective view of the first pump assembly 30 of the first SHLA assembly 20. Specifically, FIG. 7 shows a cylindrical housing 92 containing the first electric motor 70. The cylindrical housing 92 includes a pair of mounting ears 93 for holding the cylindrical housing 92 to the first HCU body 80. The mounting ears 93 may be connected to the first HCU body 80 by staking or crimping. However, other techniques may be used, such as one or more fasteners and/or adhesives. The first pump assembly 30 includes an eccentric bearing 94 turned by the first electric motor 70 to actuate the first pumping elements 72, which are mounted on opposite sides thereof, at 180-degree spacing.

Figure 8:
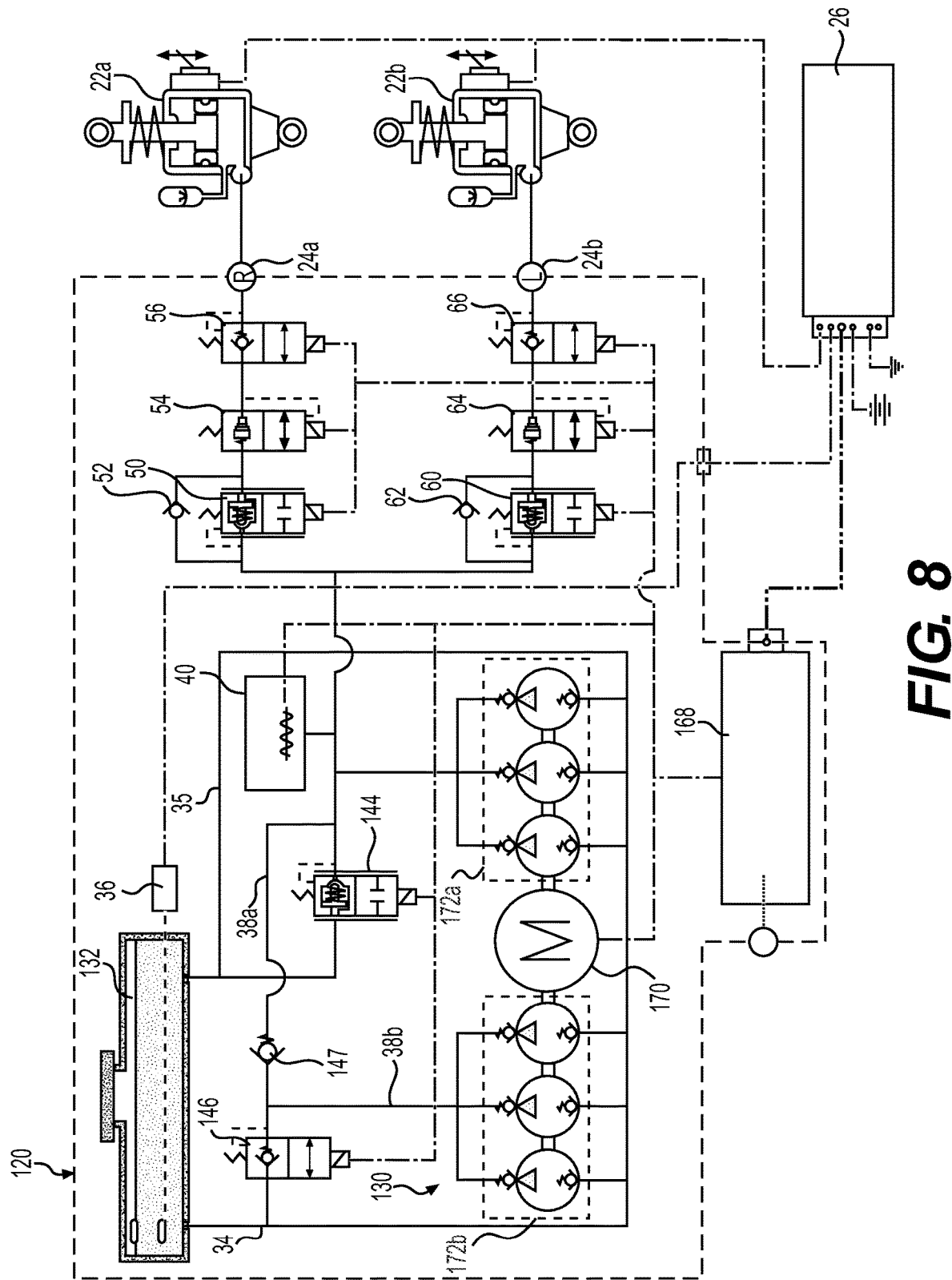
FIG. 8 shows a schematic diagram of a suspension hydraulic lift actuator (SHLA) assembly in accordance with a second embodiment of the present disclosure.

FIG. 8 shows a schematic diagram of a second SHLA assembly 120 in accordance with a second embodiment of the present disclosure. The second SHLA assembly 120 includes a second pump assembly 130 configured to pump hydraulic fluid from a second fluid reservoir 132 via one or more supply fluid passages 34, 35. The second SHLA assembly 120 includes the discharge header 38 split into a first discharge header 38a and a second discharge header 38b, with a first check valve 147 separating the discharge headers 38a, 38b and allowing fluid flow from the second discharge header 38b to the first discharge header 38a while blocking fluid flow in an opposite direction. The second SHLA assembly 120 includes a first pump recirculation valve (PRV) 146 configured to selectively control fluid flow from the second discharge header 38b to one of the supply fluid passages 34, 35 which is in fluid communication with the second fluid reservoir 132.

As shown in FIG. 8, the second pump assembly 130 includes a second electric motor 170 coupled to each of two pumping groups 172a, 172b for operating the pumping elements thereof and to pump the hydraulic fluid from the second fluid reservoir 132 to the height-adjustable dampers 22a, 22b via one or more of the discharge headers 38a, 38b.

The second SHLA assembly 120 may be characterized as an 8-valve, 6-3 pump assembly, having six pumping elements arranged in two pumping groups 172a, 172b and operable in two different modes. The two pumping groups 172a, 172b include a first pumping group 172a and a second pumping group 172b. The first pumping group 172a includes three pumping elements 1A, 2A, 3A connected in a parallel configuration to transfer hydraulic fluid from at least one of the supply fluid passages 34, 35 to the first discharge header 38a. The second pumping group 172b includes three pumping elements 1B, 2B, 3B connected in a parallel configuration to transfer the hydraulic fluid from at least one of the supply fluid passages 34, 35 to the second discharge header 38b. Together, the first pumping group 172a and the second pumping group 172b provide a 6-piston design to increase flow capability. Each of the first pumping group 172a and the second pumping group 172b includes three different pumping elements. Each of the pumping elements includes a piston movable through a corresponding bore. However, either or both of the first pumping group 172a and/or the second pumping group 172b may have a different number of pumping elements.

One problem when designing higher output pumps is that motor current draw also goes up proportionately with the number of pistons in operation to actively pump the hydraulic fluid. The first pumping group 172a and the second pumping group 172b of the second SHLA assembly 120 may be characterized as a 6-3 variable output circuit bypass pump. In normal operation, all six pumping elements may supply hydraulic fluid to the height-adjustable dampers 22a, 22b. However, by opening the first PRV 146, the fluid output of second pumping group 172b is bypassed back to the second fluid reservoir 132 at near atmospheric pressure, thus significantly reducing the load and thus current draw on the motor that is now only pumping high pressure on first pumping group 172a. The second SHLA assembly 120 may be similar to the first SHLA assembly 20. The first discharge header 38*a* directly feeds to the linear apply control valves 50, 60, which may be similar or identical to those in the first SHLA assembly 20.

The second pump assembly 130 pumps the fluid from at least one of the supply fluid passages 34, 35 and into the discharge headers 38*a*, 38*b*. The second pump assembly 130 includes six pump elements each having a piston moving through a corresponding bore, and with three of the pump elements feeding fluid to a corresponding one of the discharge headers 38*a*, 38*b*. A pressure control valve (PCV) 144 selectively controls fluid flow from the first discharge header 38*a* to at least one of the supply fluid passages 34, 35.

FIG. 9 is a diagram showing relative positions of pistons in a pump assembly of the second SHLA assembly 120. FIG. 9 shows the pump elements and how they are positioned in pairs on a series of three separate eccentric bearings. A similar design concept is shown in U.S. Pat. No. 7,823,982, which is incorporated herein by reference in its entirety. Note that the six individual pump elements are staged at an equivalent 60-degrees apart to optimize performance and noise reduction FIG. 10A is a top view showing positions of the pistons in the pump assembly of the second SHLA assembly 120, and FIG. 10B is an end view showing positions of the pistons in the pump assembly of the second SHLA assembly 120.

Figure 11:
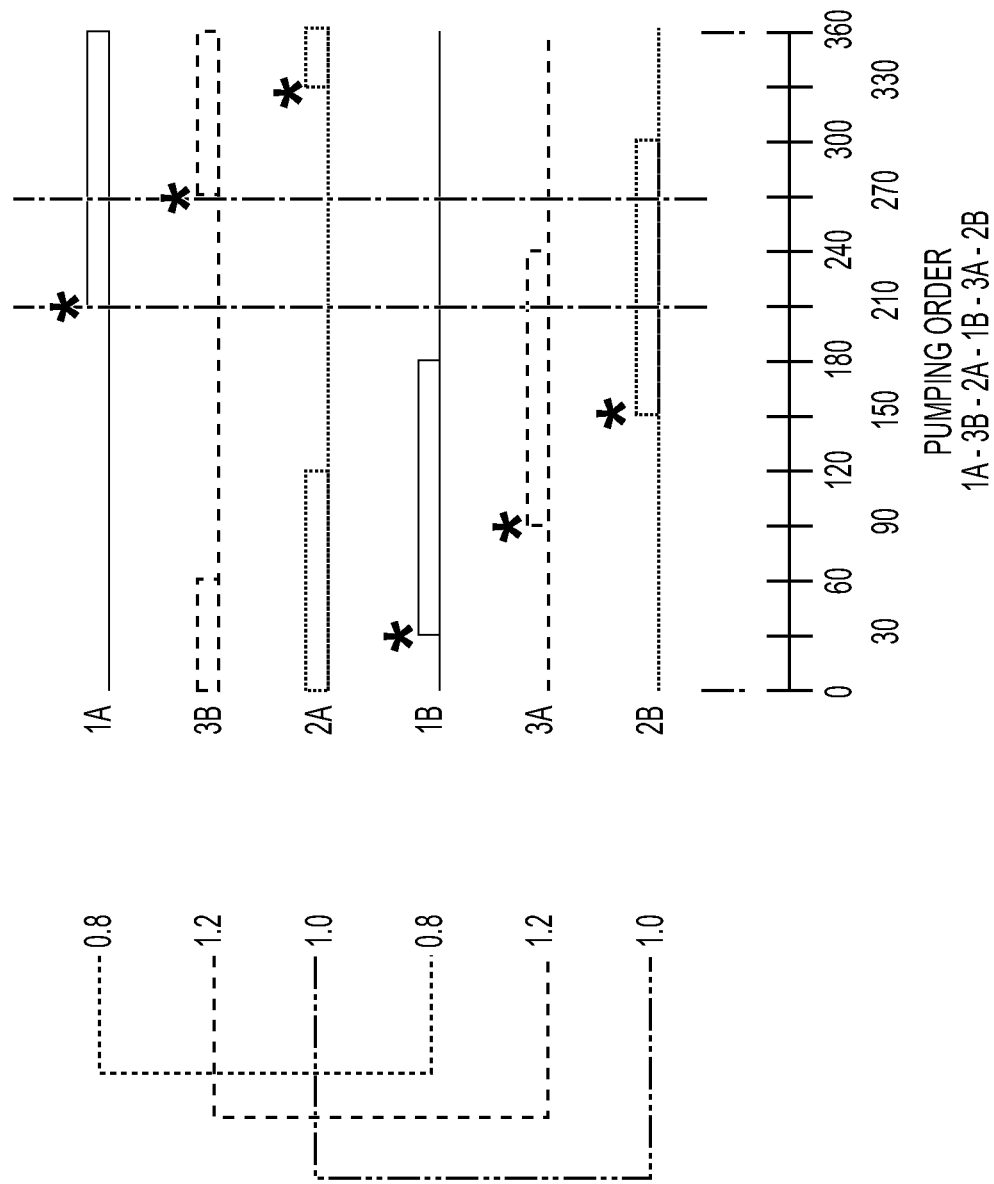
FIG. 11 is a timing diagram illustrating operation of the pump assembly of the SHLA assembly of FIG. 8.

FIG. 11 is a timing diagram illustrating operation of the pump assembly of the second SHLA assembly 120. Pump discharge noise occurs at the point in the pump cycle where pump discharge begins. If six opposing pump elements (1A, 1B, 2A, 2B, 3A, 3B) or four opposing pump elements (1A, 2B, 2A, 2B), or three pump elements (1A, 2A, 3A) from a single side are pumping, there will always be at least two discharge cycles occurring simultaneously when a given discharge cycle begins. These overlapping discharge cycles reduce pump pulsation noise by the momentary increase in compliance. If only two opposing pump elements are pumping, no overlapping of the discharge cycles occurs, and other means (e.g. orifice and damping chambers) may be required to reduce pump pulsation noises.

Figure 12A:
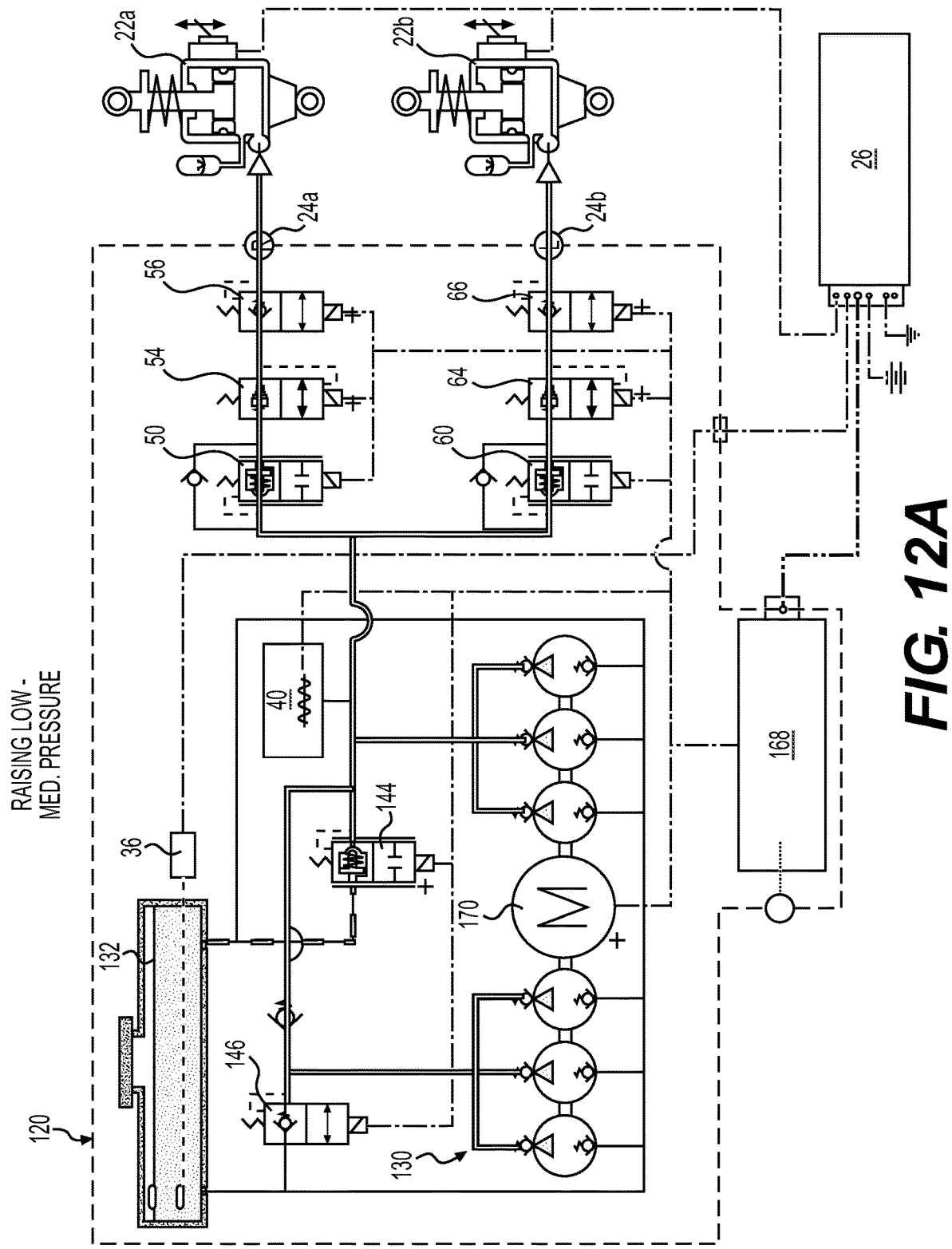
FIG. 12A shows a schematic diagram of the SHLA assembly of FIG. 8, indicating a flow path of fluid for raising the vehicle at low-medium pressure.

FIG. 12A shows a schematic diagram of the second SHLA assembly 120, indicating a flow path of fluid for raising the vehicle at low-medium pressure. To quickly raise the trim height of the vehicle the second electric motor 170 is turned on, the PCV 144 is held fully or partially closed to adjust flow rates, the four normally closed valves 54, 56, 64, 66 are energized to permit flow and the normally open linear apply control valves 50, 60 may be left off (fully open) or partially closed by applying a proportional current to control division of fluid flow between the height-adjustable dampers 22*a*, 22*b*.

Figure 12B:
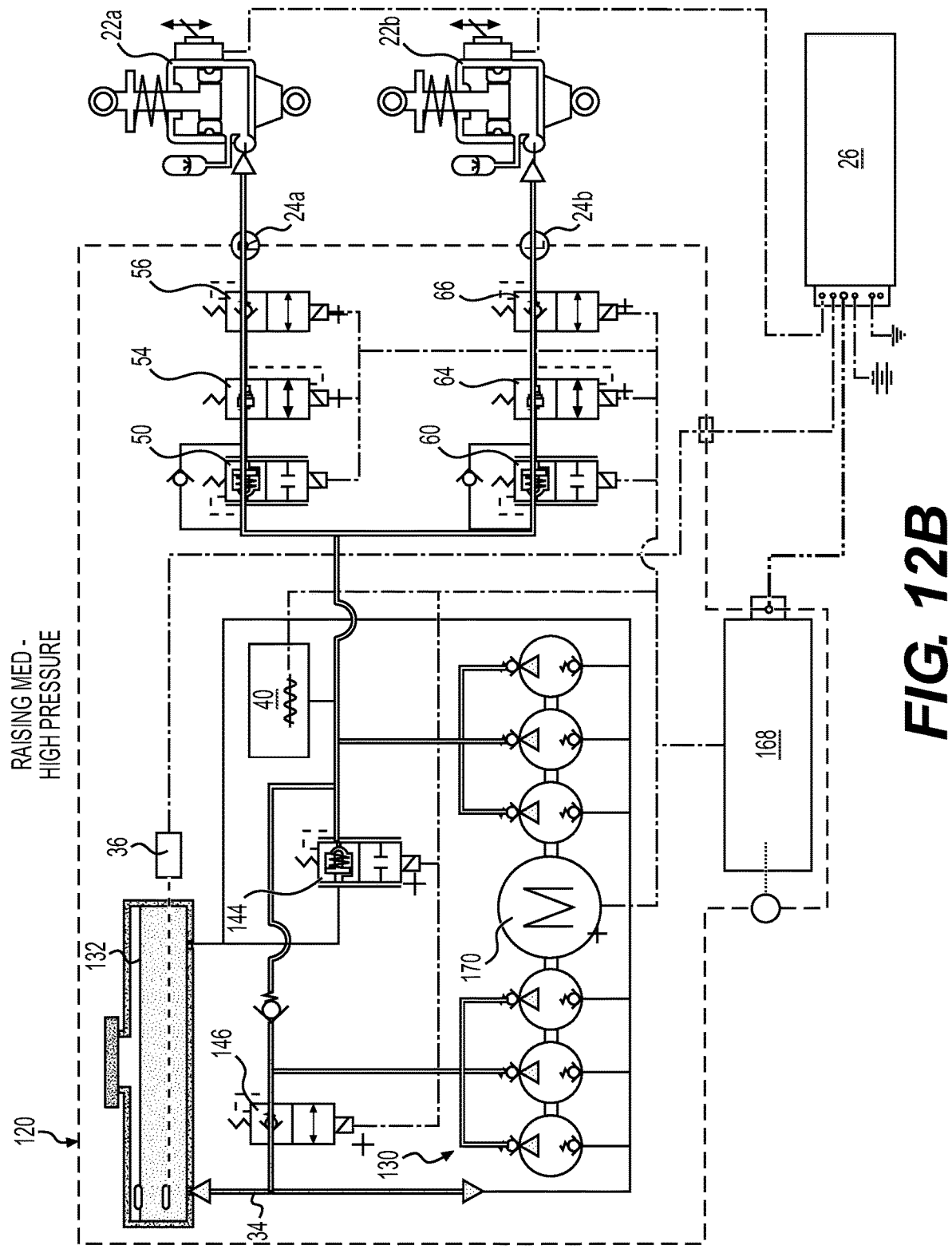
FIG. 12B shows a schematic diagram of the SHLA assembly of FIG. 8, indicating a flow path of fluid for raising the vehicle at medium-high pressure.

FIG. 12B shows a schematic diagram of the second SHLA assembly 120, indicating a flow path of fluid for raising the vehicle at medium-high pressure. To reduce current draw on the second electric motor 170 and increase stall pressure, the first PRV 146 is energized to unload half of the pump elements and bypass the flow back to reservoir. As pressure increases in this type of system, compliance also decreases lessening the need for very high flow rates. The LOWERING and MAINTAINING functions may operate similarly or identically to the 2-Pump system described above in association with FIGS. 3B-3C.

Figure 13C:
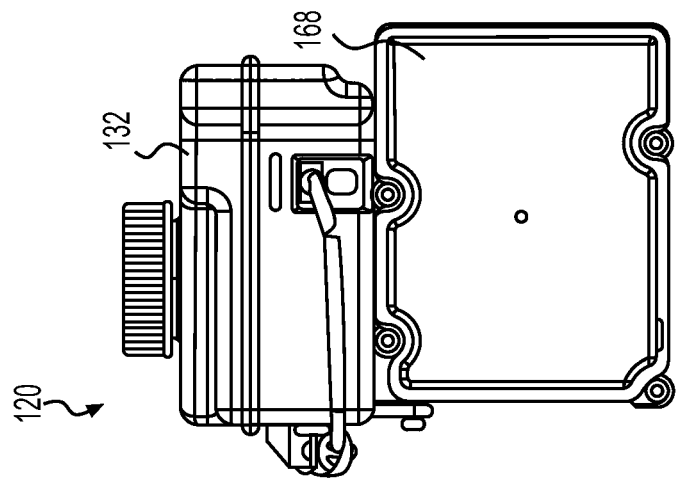
FIG. 13C shows a profile side view of the SHLA assembly of FIG. 8.
Figure 13B:
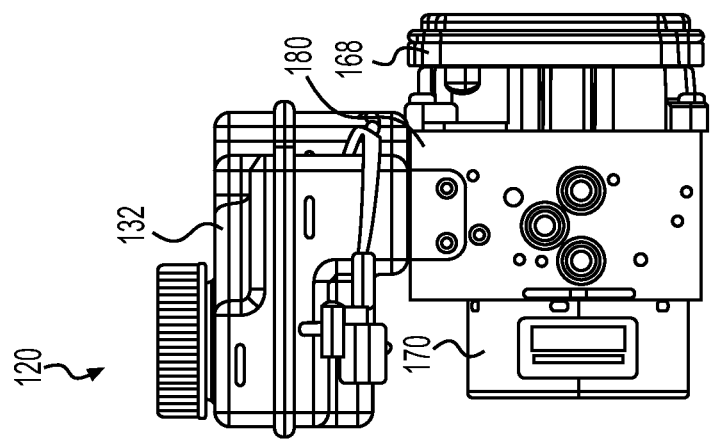
FIG. 13B shows a front-side view of the SHLA assembly of FIG. 8.
Figure 13A:
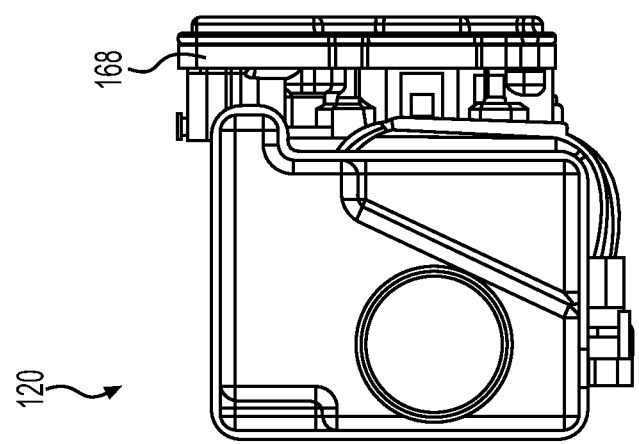
FIG. 13A shows a top view of the SHLA assembly of FIG. 8.

FIGS. 13A-13C show various views of the second SHLA assembly 120. The second SHLA assembly 120, with its 8-Valve and 6-Pump design, provides a very compact package.

Figure 14B:
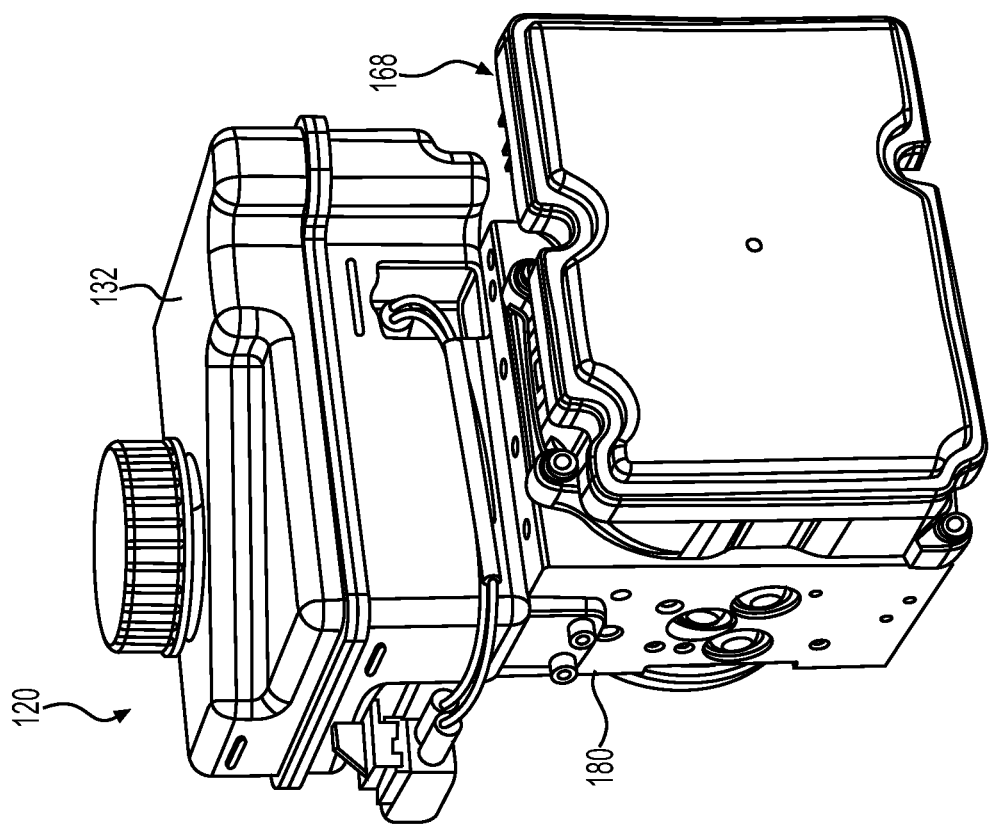
FIG. 14B shows a perspective view of the SHLA assembly of FIG. 8, with the EDC in place.
Figure 14A:
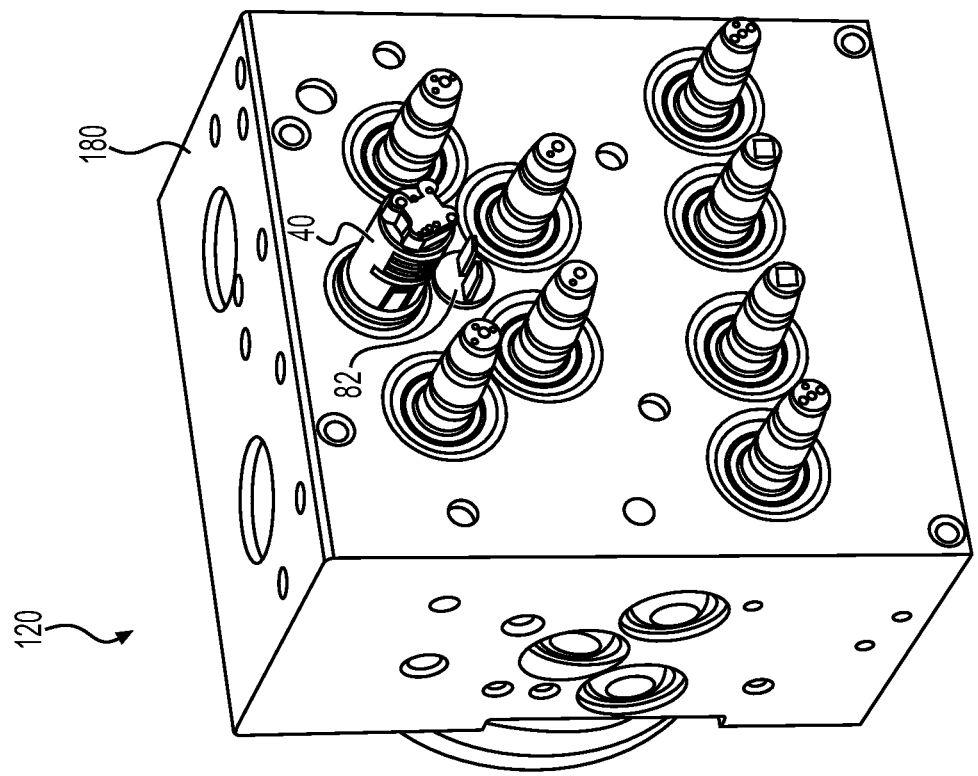
FIG. 14A shows a perspective view of the SHLA assembly of FIG. 8, without the EDC installed.
Figure 15:
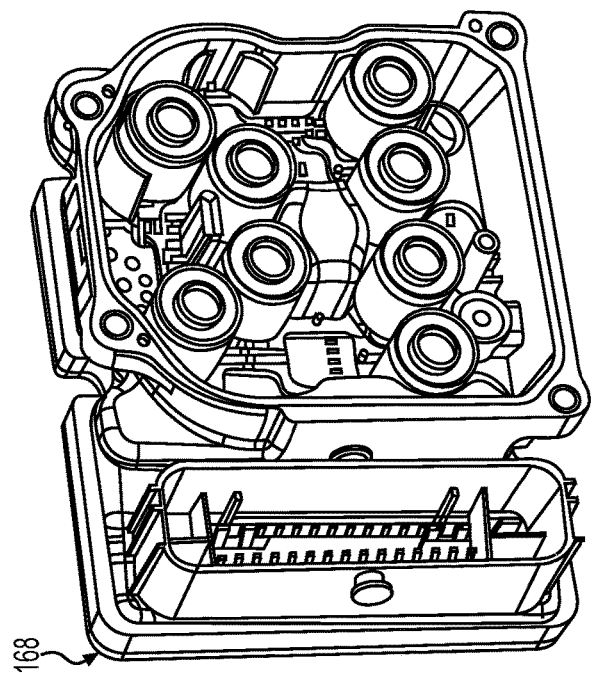
FIG. 15 shows a perspective view of the EDC of the SHLA assembly of FIG. 8.
Figure 16:
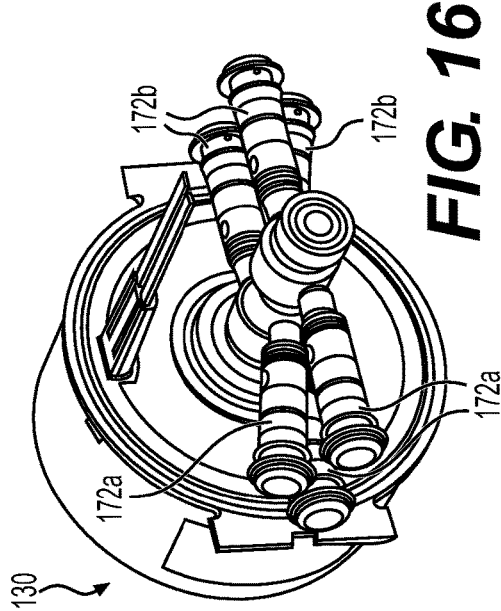
FIG. 16 shows a perspective view of the pump assembly of the SHLA assembly of FIG. 8.
Figure 14C:
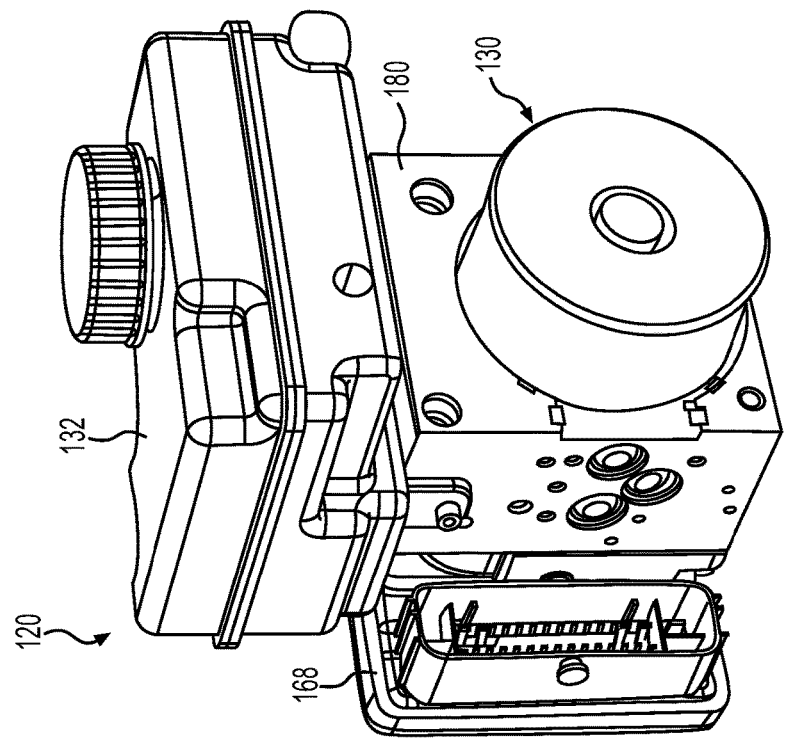
FIG. 14C shows another perspective view of the SHLA assembly of FIG. 8, showing attachment of the pump assembly.

FIG. 14A shows a perspective view of the second SHLA assembly 120, including a second HCU body 180. The second HCU body 180 may be similar to the first HCU body 80 of the first SHLA assembly 20, except sized and adapted to hold the eight valves and the six pumping elements of the second SHLA assembly 120. FIG. 14B shows a perspective view of the second SHLA assembly 120, with a second EDC 168, and the second fluid reservoir 132 mounted to the second HCU body 180. FIG. 14C shows another perspective view of the second SHLA assembly 120, showing attachment of the second pump assembly 130 to a face of the second HCU body 180 opposite from the second EDC 168. FIG. 15 shows a perspective view of the second EDC 168 of the second SHLA assembly 120. FIG. 16 shows a perspective view of the second pump assembly 130 of the second SHLA assembly 120.

Figure 17:
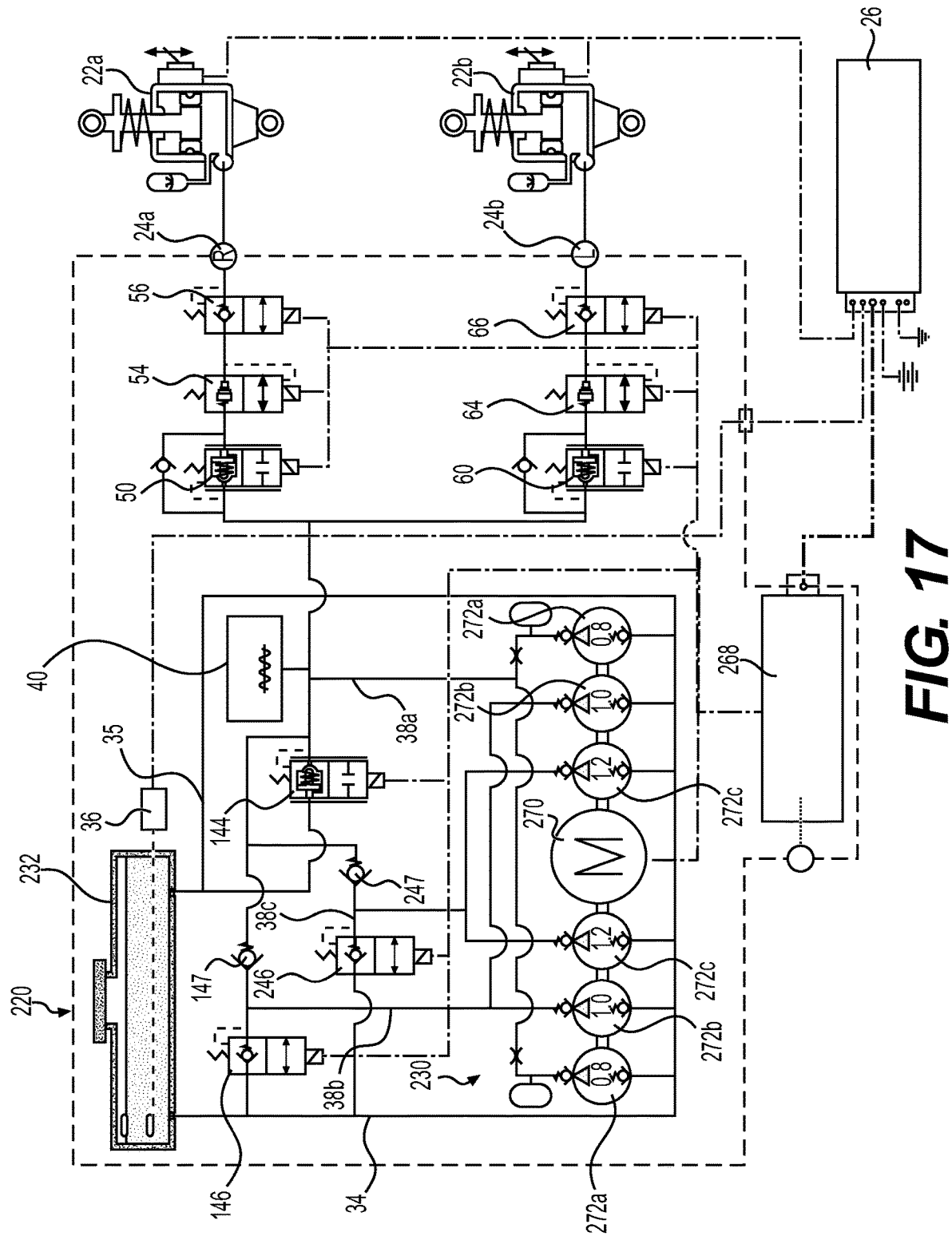
FIG. 17 shows a schematic diagram of a SHLA assembly in accordance with a third embodiment of the present disclosure.

FIG. 17 shows a schematic diagram of a third SHLA assembly 220 in accordance with a third embodiment of the present disclosure. The third SHLA assembly 220 is similar to the second SHLA assembly 120 of FIG. 8, with the addition of a third discharge header 38*c*. The third SHLA assembly 220 includes a third pump assembly 230 configured to pump hydraulic fluid from a third fluid reservoir 232 via one or more supply fluid passages 34, 35.

The third SHLA assembly 220 may be characterized as a 9-valve, 6-4-2 pump assembly, having six pumping elements arranged in three pumping groups 272*a*, 272*b*, 272*c* and operable in three different modes. Each of the three pumping groups 272*a*, 272*b*, 272*c* includes two different pumping elements. Each of the pumping elements includes a piston movable through a bore to transfer hydraulic fluid. Instead of pumping groups being tied together at their outlets in groups of three (as in the second SHLA assembly 120), the pumps outlets are tied together in groups of two. More specifically, in groups of two that share the same eccentric bearing on the pump output shaft. This arrangement provides two benefits: 1) Output flows from two or four of the pump elements can be bypassed back to reservoir and 2) the pump eccentric bearings may now be at different offsets. This has the additional benefit of changing the mechanical advantage at high pressures the motor can run at higher speeds resulting in greater efficiency and lower current draw.

As shown in FIG. 17, the third SHLA assembly 220 includes three discharge headers 38*a*, 38*b*, 38*c* and a third electric motor 270 coupled to each of three pumping groups 272*a*, 272*b*, 272*c* for operating the pumping elements thereof. Specifically, the three pumping groups 272*a*, 272*b*, 272*c* include a third pumping group 272*a*, a fourth pumping group 272*b*, and a fifth pumping group 272*c*. The third pumping group 272*a* includes two pumping elements configured to transfer hydraulic fluid from at least one of the supply fluid passages 34, 35 to the first discharge header 38*a*. The fourth pumping group 272*b* includes two pumping elements configured to transfer hydraulic fluid from at least one of the supply fluid passages 34, 35 to the second discharge header 38*b*. The fifth pumping group 272*c* includes two pumping elements configured to transfer hydraulic fluid from at least one of the supply fluid passages 34, 35 to the third discharge header 38*c*. Each of the pumping elements includes a piston movable through a corresponding bore. However, any or all of the pumping groups 272*a*, 272*b*, 272*c* may have a different number of pumping elements.

The pumping elements of the three pumping groups 272*a*, 272*b*, 272*c* may each have different flow characteristics. For example, the pumping elements of the third pumping group 272*a* may be configured to provide 0.8 times the flow of the pumping elements of the fourth pumping group 272b, and the pumping elements of the fifth pumping group 272c may be configured to provide 1.2 times the flow of the pumping elements of the fourth pumping group 272b. These are merely examples, and the three pumping groups 272a, 272b, 272c may have a different set of flow characteristics.

Similar or identically to the second SHLA assembly 120, the third SHLA assembly 220 includes a first PRV 146 to selectively control fluid flow from the second discharge header 38b to one of the supply fluid passages 34, 35 which is in fluid communication with the third fluid reservoir 232. The third SHLA assembly 220 also includes a second PRV 246 to selectively control fluid flow from the third discharge header 38c to one of the supply fluid passages 34, 35 which is in fluid communication with the third fluid reservoir 232.

A first check valve 147 separates the first and second discharge headers 38a, 38b and allows fluid flow from the second discharge header 38b to the first discharge header 38a while blocking fluid flow in an opposite direction. A second check valve 247 separates the first and third discharge headers 38a, 38c and allows fluid flow from the third discharge header 38c to the first discharge header 38a while blocking fluid flow in an opposite direction.

As shown in FIG. 17, the third SHLA assembly 220 includes first and second sets of control valves 50, 54, 56, 60, 64, 66 that are configured similarly or identically to those of the second SHLA assembly 120 shown in FIG. 8.

Figure 18A:
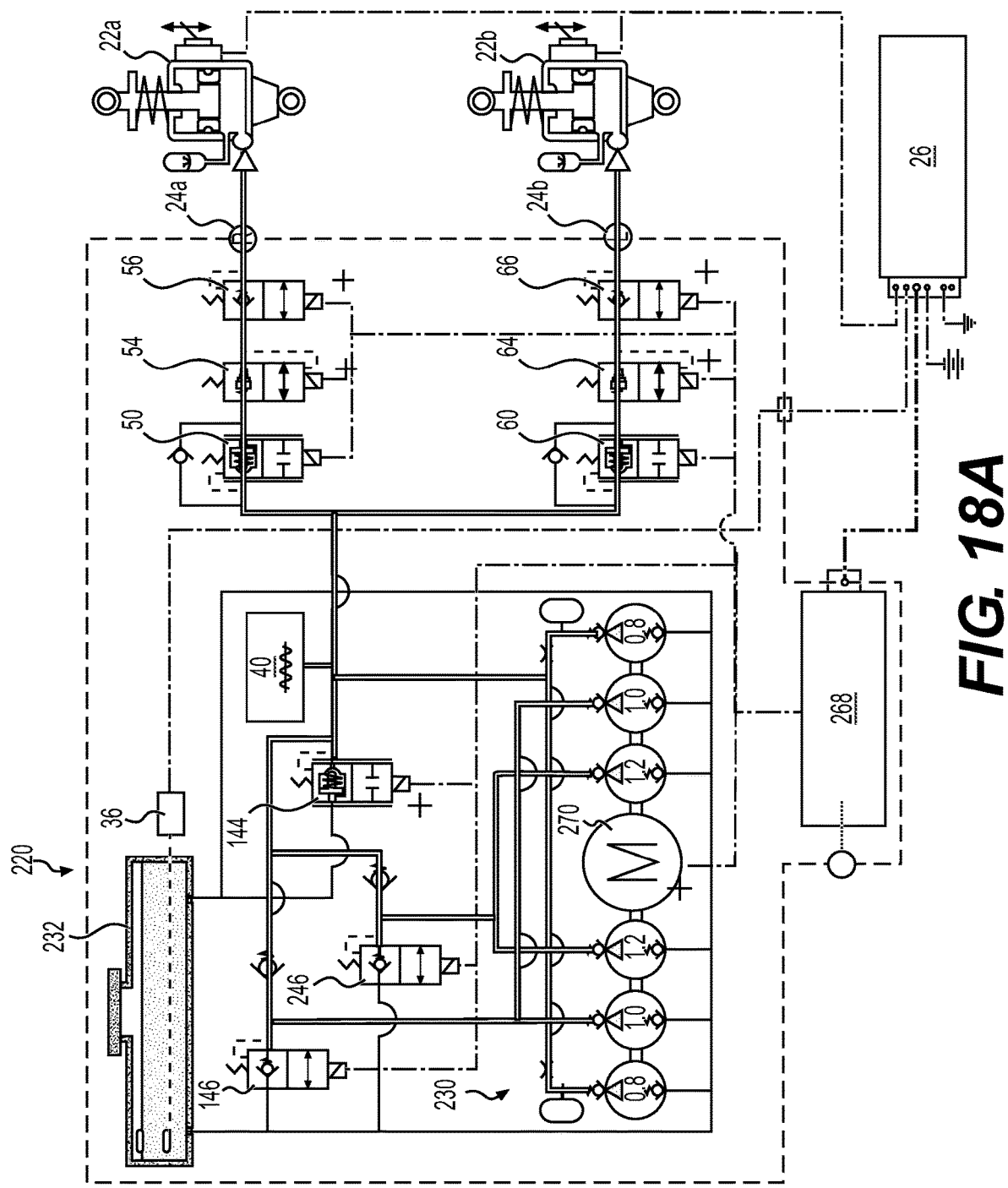
FIG. 18A shows a schematic diagram of the SHLA assembly of FIG. 17, indicating a flow path of fluid for raising the vehicle at low pressure.

FIG. 18A shows a schematic diagram of the third SHLA assembly 220, indicating a flow path of fluid for raising the vehicle at low pressure. To quickly raise the trim height of the vehicle the pump motor is turned on, the PCV is held fully or partially closed to adjust flow rates, the four normally-closed control valves 54, 56, 64, 66 are energized to permit flow and the normally-open control valves 50, 60 may be left off (fully open) or partially closed (for example, by applying a proportional current) to control flow division between the left and right height-adjustable dampers 22a, 22b.

Figure 18B:
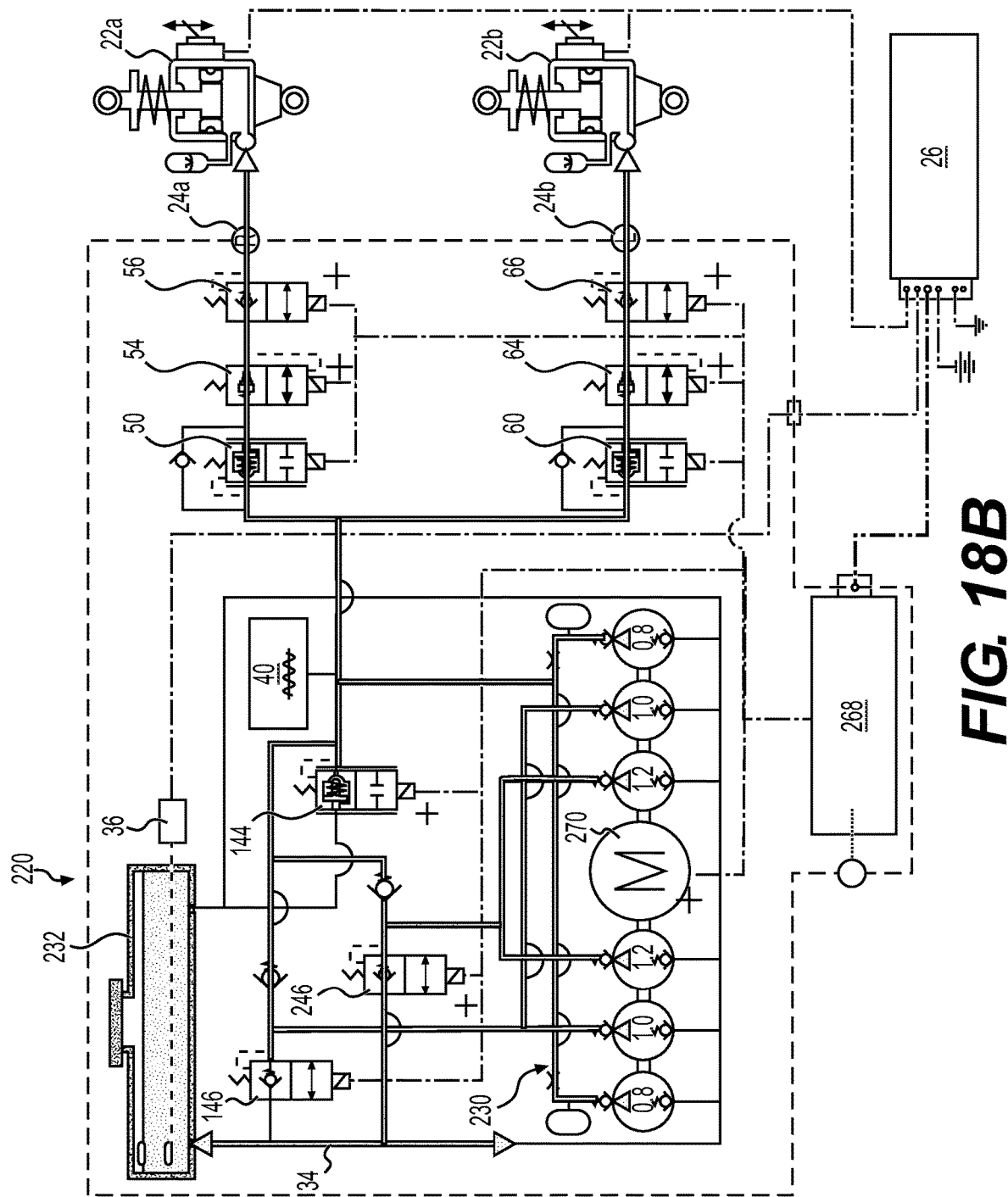
FIG. 18B shows a schematic diagram of the SHLA assembly of FIG. 17, indicating a flow path of fluid for raising the vehicle at medium pressure.

FIG. 18B shows a schematic diagram of the third SHLA assembly 220, indicating a flow path of fluid for raising the vehicle at medium pressure. To reduce current draw on the motor and increase stall pressure, the second pump recirculation valve 246 is energized to unload one third of the pump elements and bypass the flow back to reservoir. As pressure increases in this type of system, compliance also decreases lessening the need for very high flow rates.

Figure 18C:
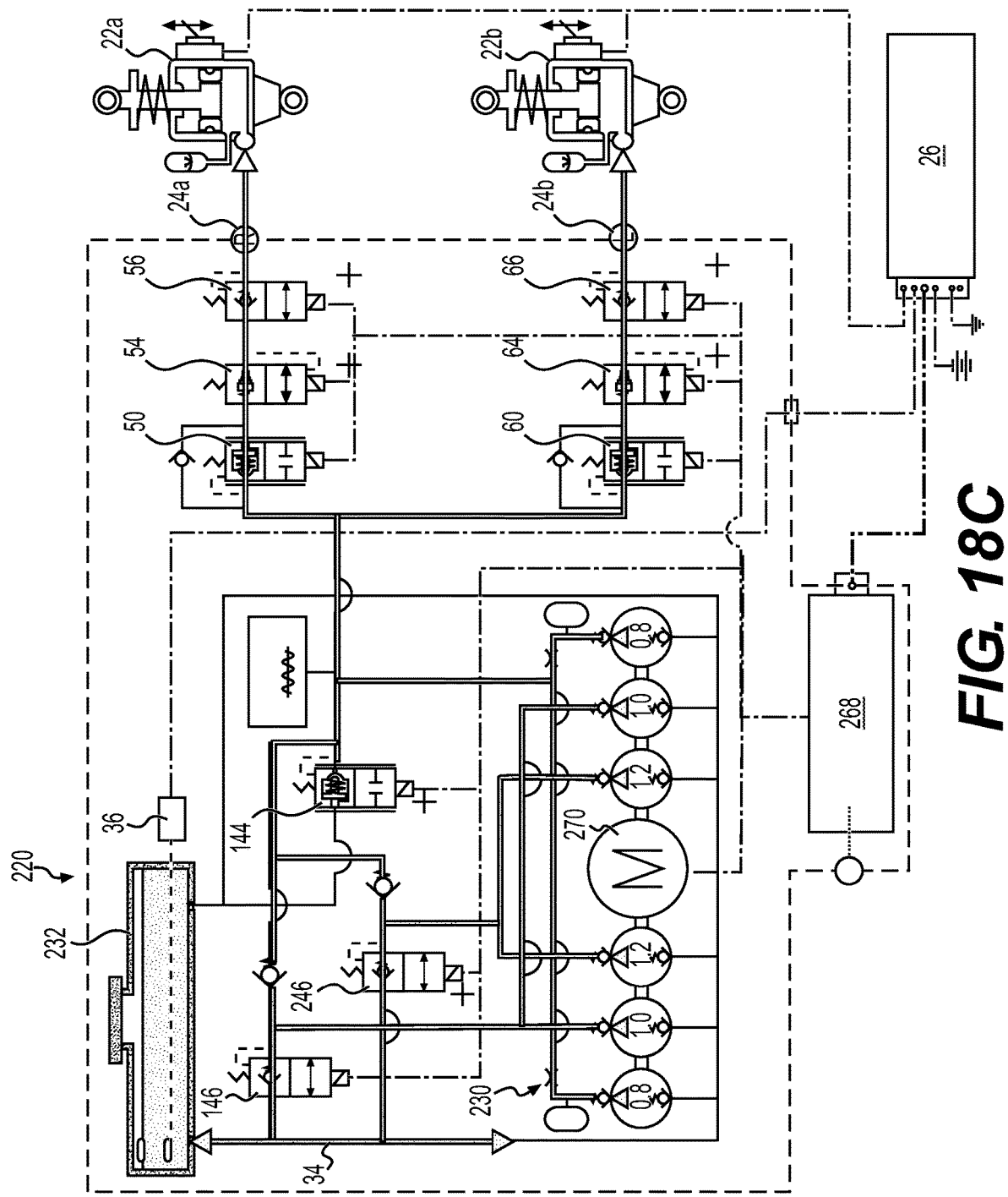
FIG. 18C shows a schematic diagram of the SHLA assembly of FIG. 17, indicating a flow path of fluid for raising the vehicle at high pressure.

FIG. 18C shows a schematic diagram of the third SHLA assembly 220, indicating a flow path of fluid for raising the vehicle at high pressure. To further reduce current draw on the motor and increase stall pressure, the first and second pump recirculation valves 146, 246 are energized to unload two thirds of the pump elements and bypass the flow back to reservoir. As pressure increases in this type of system, compliance also decreases lessening the need for very high flow rates. The LOWERING and MAINTAINING functions may operate similarly or identically to the 2-Pump system described above in association with FIGS. 3B-3C.

Figure 19C:
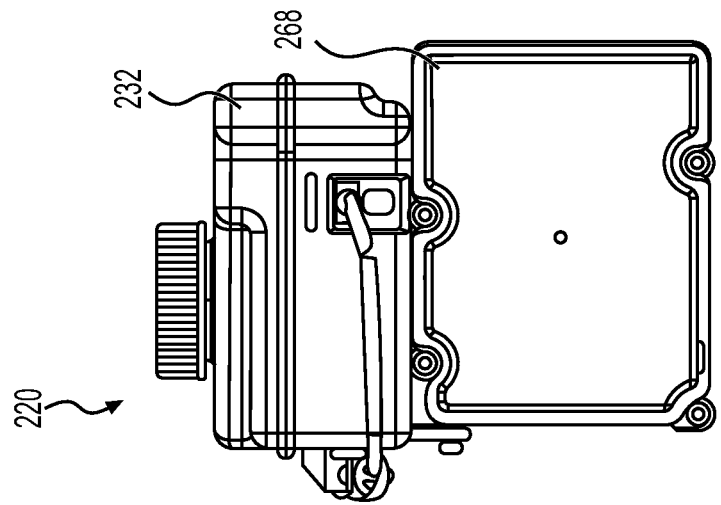
FIG. 19C shows a profile side view of the SHLA assembly of FIG. 17.
Figure 19B:
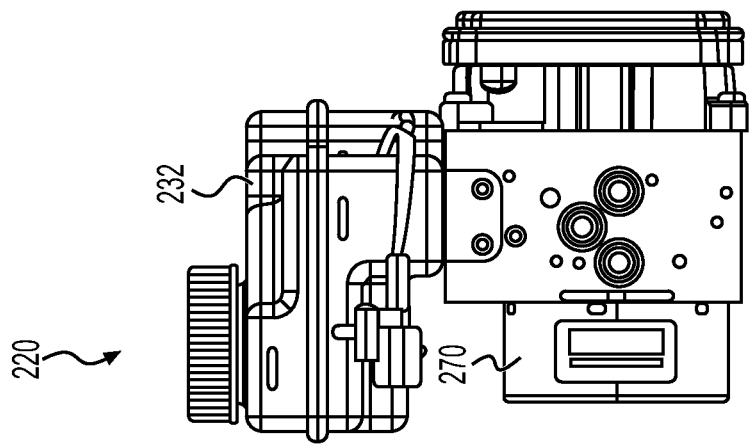
FIG. 19B shows a front-side view of the SHLA assembly of FIG. 17.
Figure 19A:
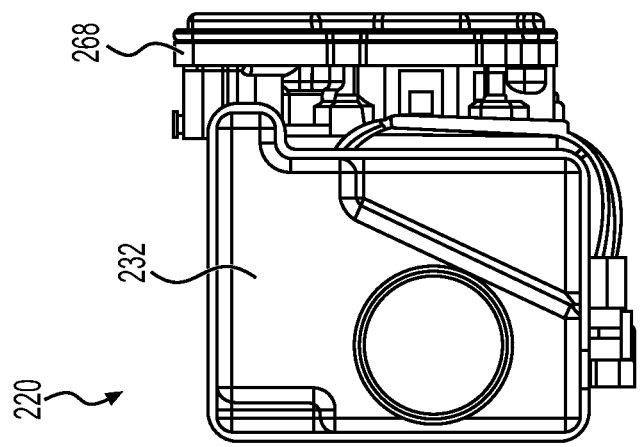
FIG. 19A shows a top view of the SHLA assembly of FIG. 17.

FIGS. 19A-19C show various views of the third SHLA assembly 220. The third SHLA assembly 220, with its 8-Valve and 6-Pump design, provides a very compact package. Reservoirs may be sized to fit packaging requirements of a given application.

Figure 20B:
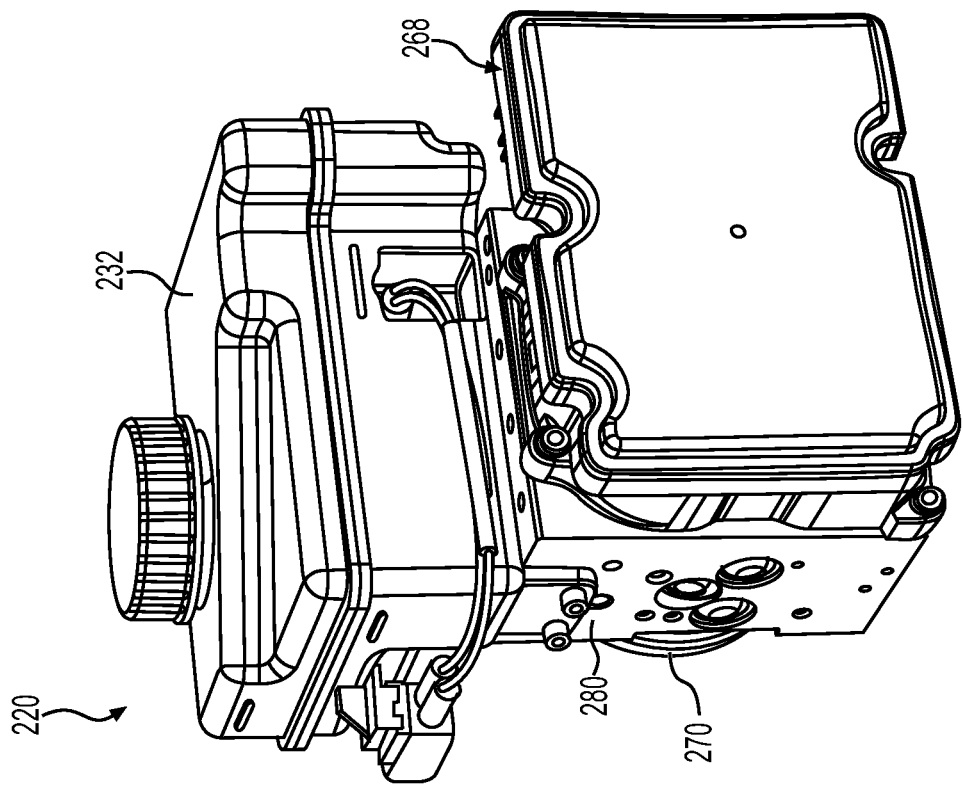
FIG. 20B shows a perspective view of the SHLA assembly of FIG. 17, with the EDC in place.
Figure 20A:
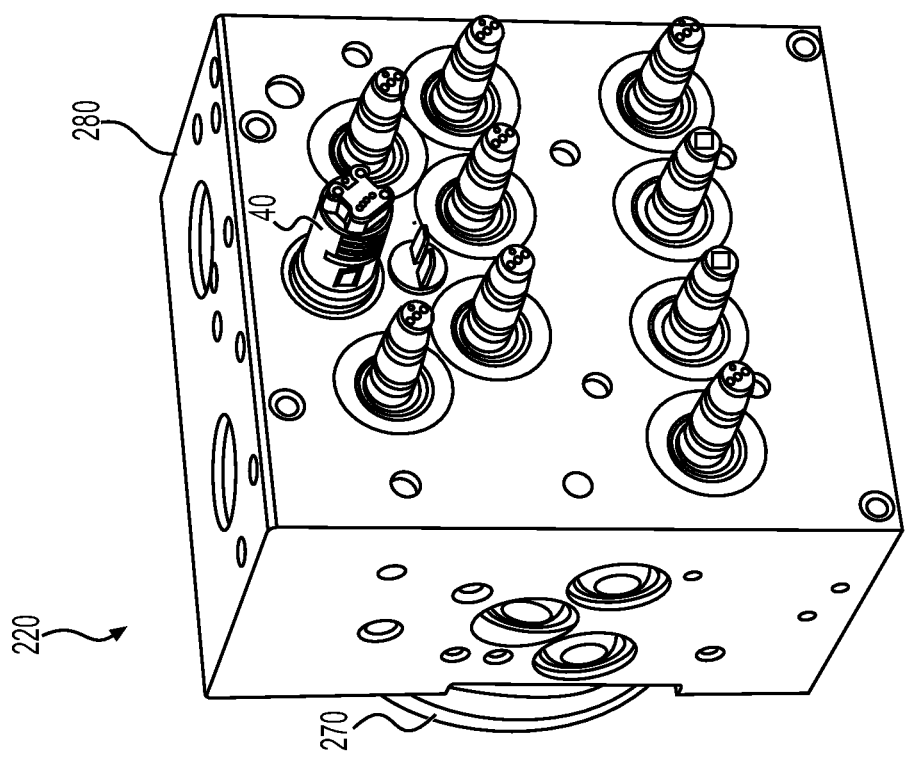
FIG. 20A shows a perspective view of the SHLA assembly of FIG. 17, without the EDC installed.
Figure 21:
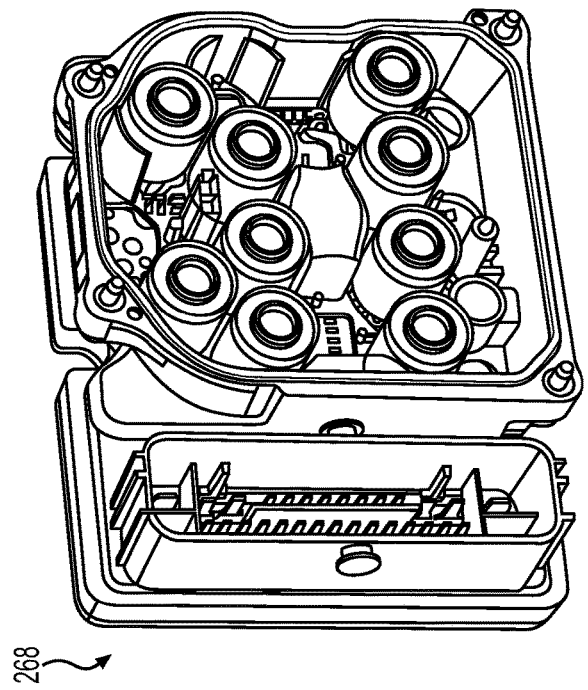
FIG. 21 shows a perspective view of the EDC of the SHLA assembly of FIG. 17.
Figure 22:
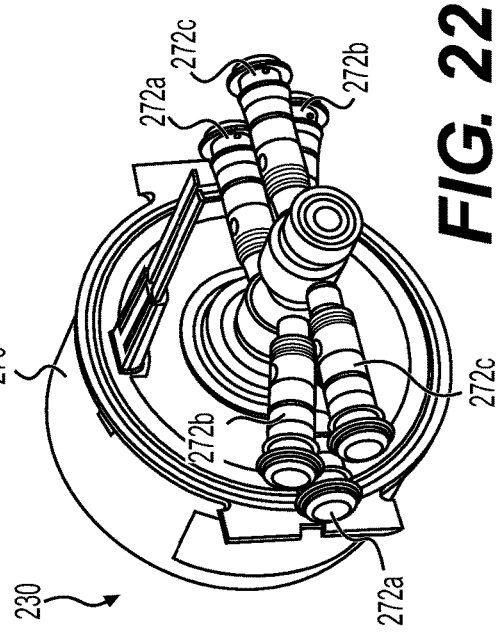
FIG. 22 shows a perspective view of the pump assembly of the SHLA assembly of FIG. 17.
Figure 20C:
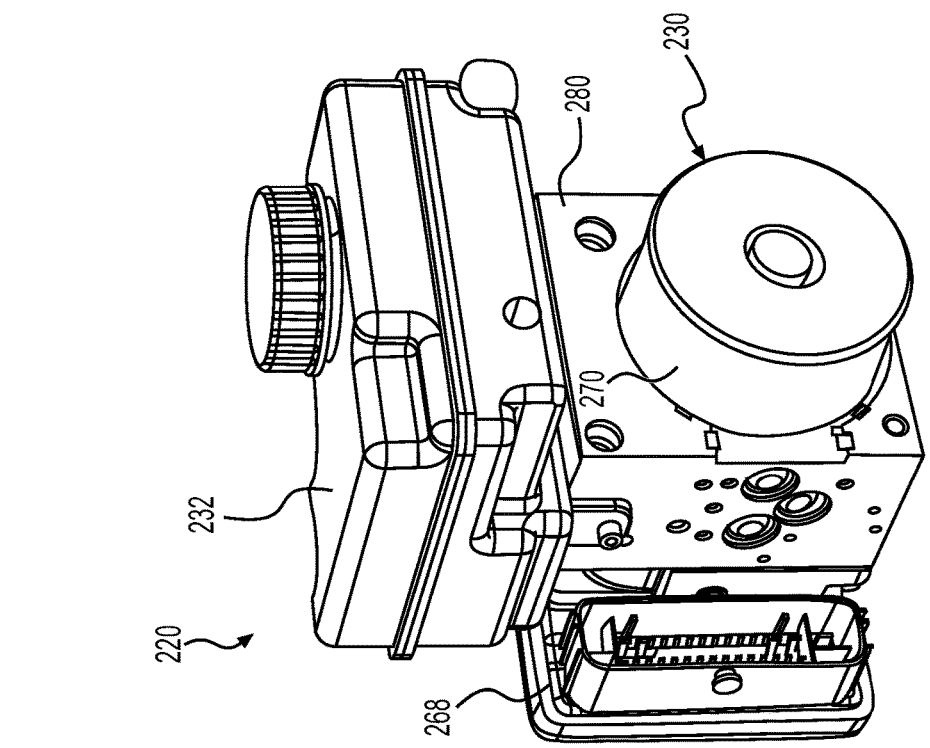
FIG. 20C shows another perspective view of the SHLA assembly of FIG. 17, showing attachment of the pump assembly.

FIG. 20A shows a perspective view of the third SHLA assembly 220, including a third HCU body 280. The third HCU body 280 may be similar to the second HCU body 180 of the second SHLA assembly 120, except sized and adapted to hold the nine valves and the six pumping elements in the pumping groups 272a, 272b, 272c of the third SHLA assembly 220. FIG. 20B shows a perspective view of the third SHLA assembly 220, with a third EDC 268, and a third reservoir 232 mounted to the third HCU body 280. FIG. 20C shows another perspective view of the third SHLA assembly 220, showing attachment of a third pump assembly 230 to a face of the third HCU body 280 opposite from the third EDC 268. FIG. 21 shows a perspective view of the third EDC 268 of the third SHLA assembly 220. The third HCU body 280 has a 9-Valve, 6-4-2 configuration and is optimized minimize packaging space. With exception of the two pump elements offset at a 15-degree angle, all other drills are orthogonal to a face of the third HCU body 280, thus reducing machining costs over conventional designs having a greater number of non-orthogonal features. FIG. 22 shows a perspective view of the third pump assembly 230 of the third SHLA assembly 220, without the third HCU body 280, for ease of illustration.

FIG. 23 shows a schematic diagram of a fourth SHLA assembly 320 in accordance with a fourth embodiment of the present disclosure. The fourth SHLA assembly 320 may be characterized as a 7-valve, 6-4-2 pump assembly, having six pumps operable in three different modes. The fourth SHLA assembly 320 may be similar to the third SHLA assembly 220, but without the normally-open (NO) linear apply control valves 50, 60, which may reduce cost for cases where side-to-side flow control on a given axle is not required. All other functions may remain the same. FIG. 24 shows a perspective view of the fourth SHLA assembly 320, including a fourth HCU body 380. The fourth HCU body 380 may be similar to the third HCU body 280 of the third SHLA assembly 220, except sized and adapted to hold the seven valves and the six pumping groups 272a, 272b, 272c of the fourth SHLA assembly 320.

Figure 25:
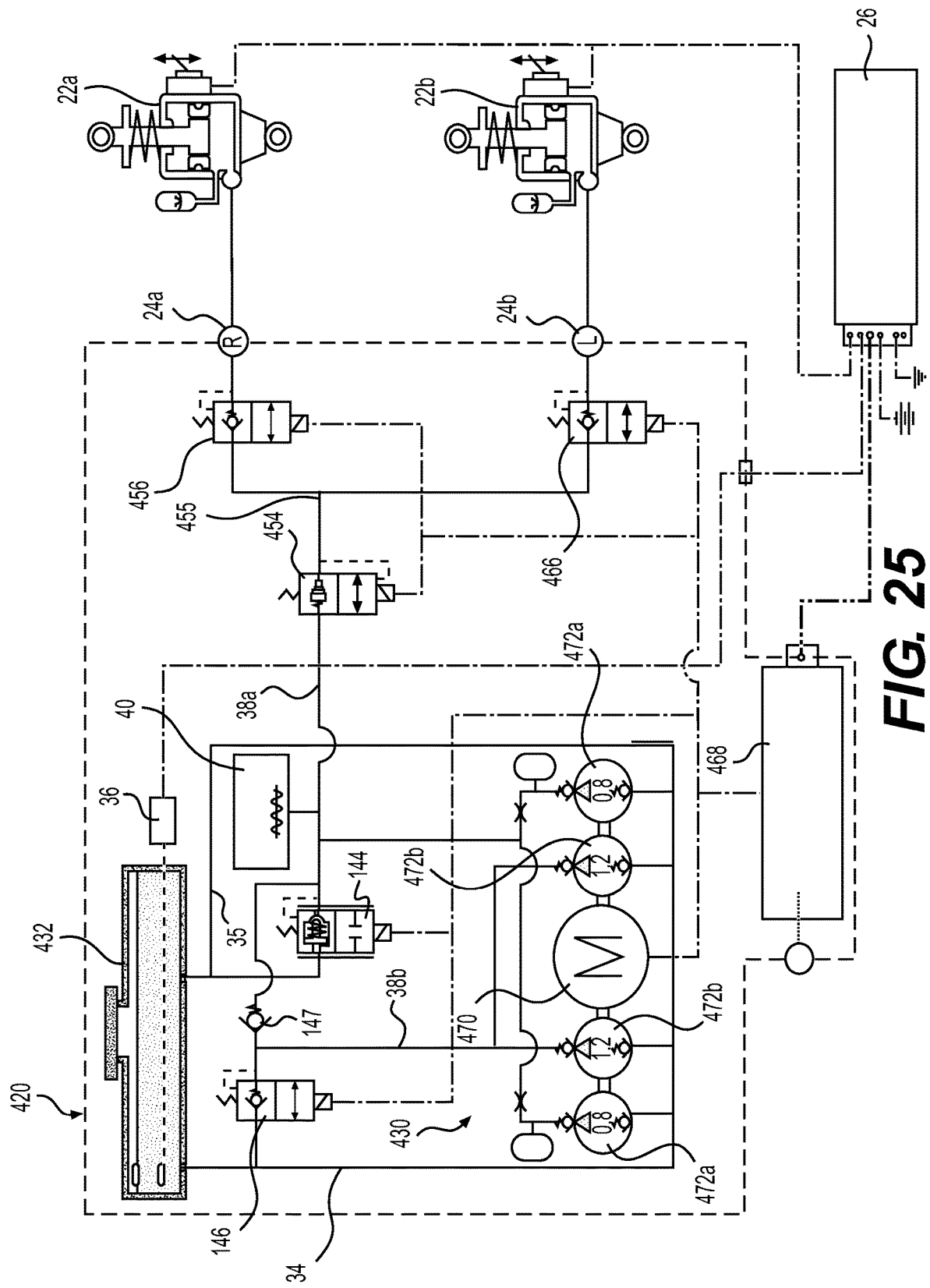
FIG. 25 shows a schematic diagram of a SHLA assembly in accordance with a fifth embodiment of the present disclosure.

FIG. 25 shows a schematic diagram of a fifth SHLA assembly 420 in accordance with a fifth embodiment of the present disclosure. The fifth SHLA assembly 420 is similar to the second SHLA assembly 120 of FIG. 8, with a few changes described herein.

The fifth SHLA assembly 420 may be characterized as a 5-valve, 4-2 pump assembly, having four (4) pumping elements arranged in two pumping groups 472a, 472b and operable in two different modes. The fifth SHLA assembly 420 may provide increased flow rate compared to the base 2-Pump Design, without a need for side-to-side flow control. The fifth SHLA assembly 420 consolidates to a single normally closed valve with the elastomeric seal, in place of the two normally closed valves 54, 56, 64, 66 used in other embodiments.

The fifth SHLA assembly 420 of FIG. 25 includes a fourth pump assembly 430 with a fifth electric motor 470 configured to drive four pumping elements arranged in the in a sixth pumping group 472a, and a seventh pumping group 472b. Each of the sixth pumping group 472a and the seventh pumping group 472b includes one or more pumping elements is configured to transfer the hydraulic fluid to a corresponding one of the discharge headers 38a, 38b. Each of the pumping elements includes a piston movable through a corresponding bore. However, either or both of the sixth pumping group 472a and/or the seventh pumping group 472b may have a different number of pumping elements.

The fifth SHLA assembly 420 includes a first isolation solenoid valve 454 having an elastomeric seat and configured to selectively block fluid flow from the first discharge header 38a to an intermediate fluid passage 455. A second isolation solenoid valve 456 having a metal seat is connected in series with the first isolation solenoid valve 454 and is configured to selectively block fluid flow from the intermediate fluid passage 455 to the right-side fluid supply port 24a.

The fifth SHLA assembly 420 also includes a third isolation solenoid valve 466 having a metal seat and configured to selectively block fluid flow from the intermediate fluid passage 455 to the left-side fluid supply port 24b.

Each of the isolation solenoid valves 454, 456, 466 are normally-closed valves, although a normally-open valve may be used for any or all of the isolation solenoid valves 454, 456, 466.

Figure 26:
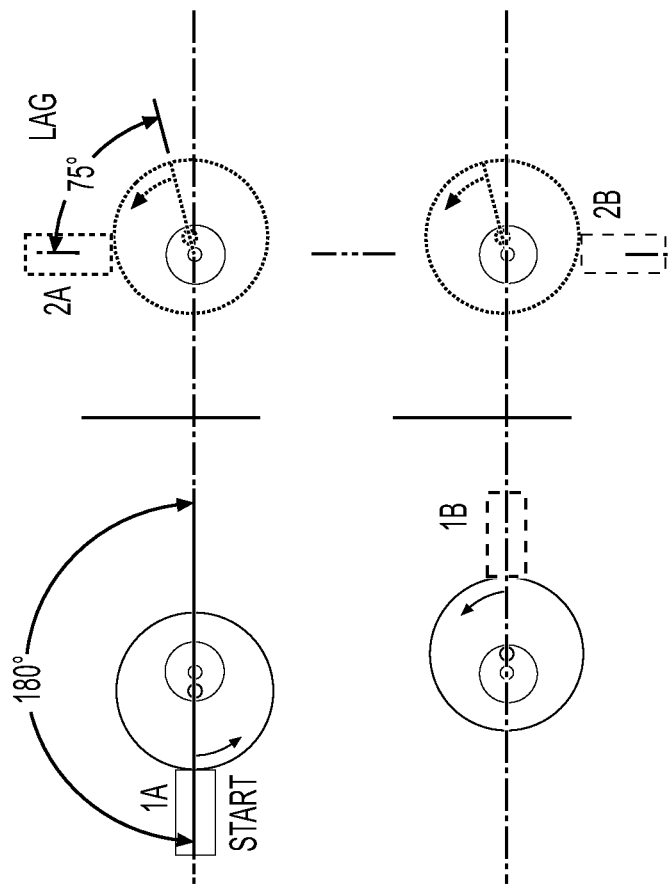
FIG. 26 is a diagram showing relative positions of pistons in a pump assembly of the SHLA assembly of FIG. 25.

FIG. 26 is a diagram showing relative positions of pistons in a pump assembly of the fifth SHLA assembly 420 of FIG. 25. For maximum pumping efficiency and durability, each set of pumps may be driven by a separate eccentric bearing assembly. This prevents simultaneous high-pressure exposure to opposing piston causing increased drag force.

Figure 27A:
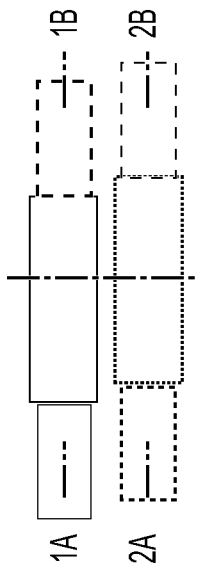
FIG. 27A is a top view showing positions of the pistons in the pump assembly of the SHLA assembly of FIG. 25.
Figure 27B:
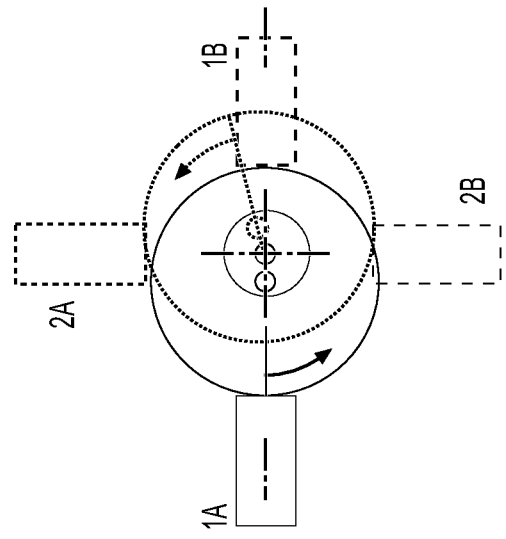
FIG. 27B is an end view showing positions of the pistons in the pump assembly of the SHLA assembly of FIG. 25.

FIG. 27A is a top view showing positions of the pistons in the pump assembly of the fifth SHLA assembly 420. FIG. 27B is an end view showing positions of the pistons in the fifth SHLA assembly 420.

Figure 28:
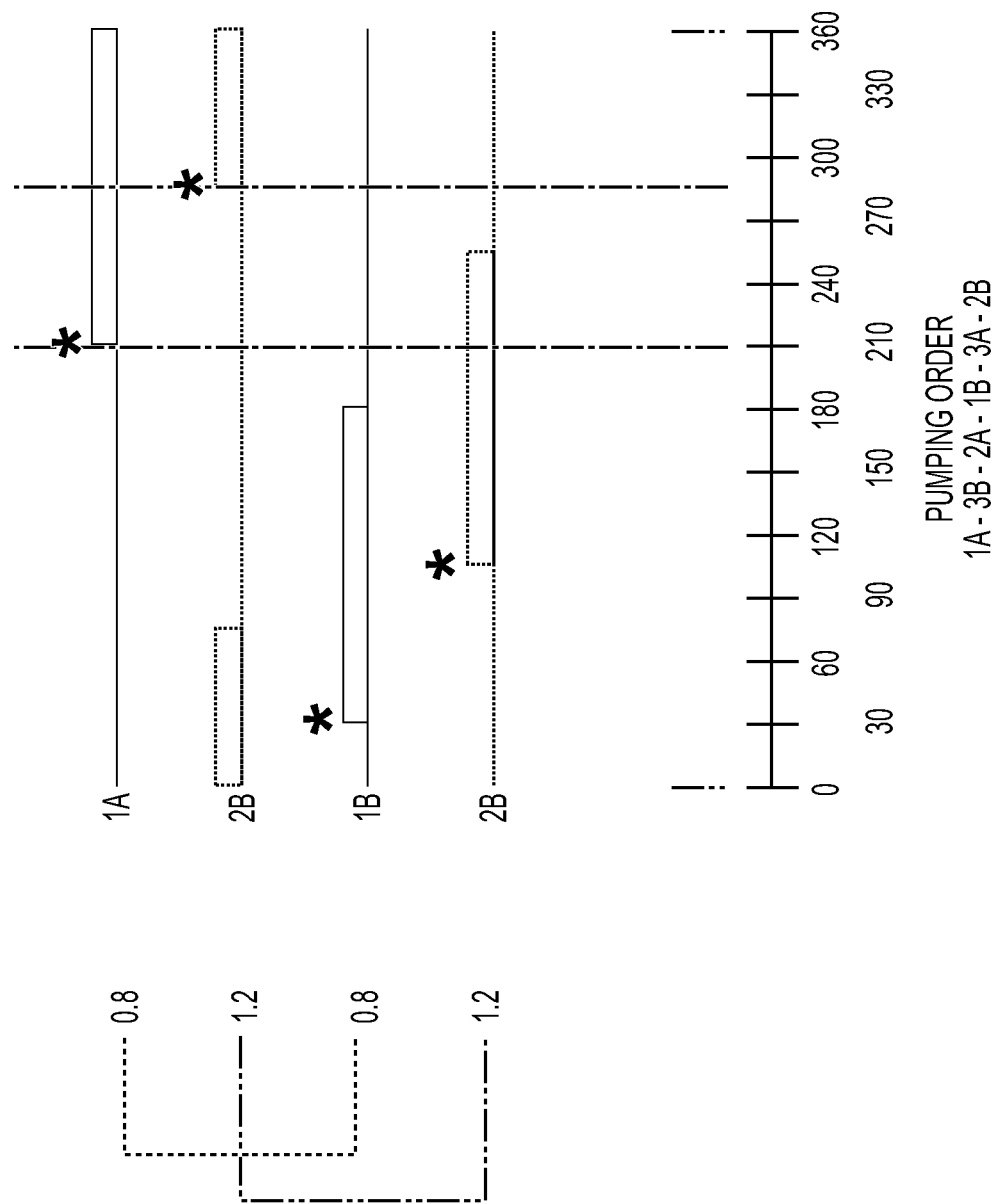
FIG. 28 is a timing diagram illustrating operation of the pump assembly of the SHLA assembly of FIG. 25.

FIG. 28 is a timing diagram illustrating operation of the pump assembly of the fifth SHLA assembly 420. Discharge typically begins about 30-degrees after bottom dead center. To center the opening of the next pump element discharge cycle requires a 75-degree offset. This assures that there are always a second pump element discharging when another one begins its discharge cycle. Pump discharge noise occurs at the point in the pump cycle where pump discharge begins. With proper offset, if four opposing pump elements are pumping, there will always be at least two discharge cycles occurring simultaneously when a given discharge cycle begins. These overlapping discharge cycles reduce pump pulsation noise. If only two opposing pump elements are pumping, no overlapping of the discharge cycles occurs, and other means (e.g. orifice and damping chambers) may be required to reduce pump pulsation noises.

Figure 29A:
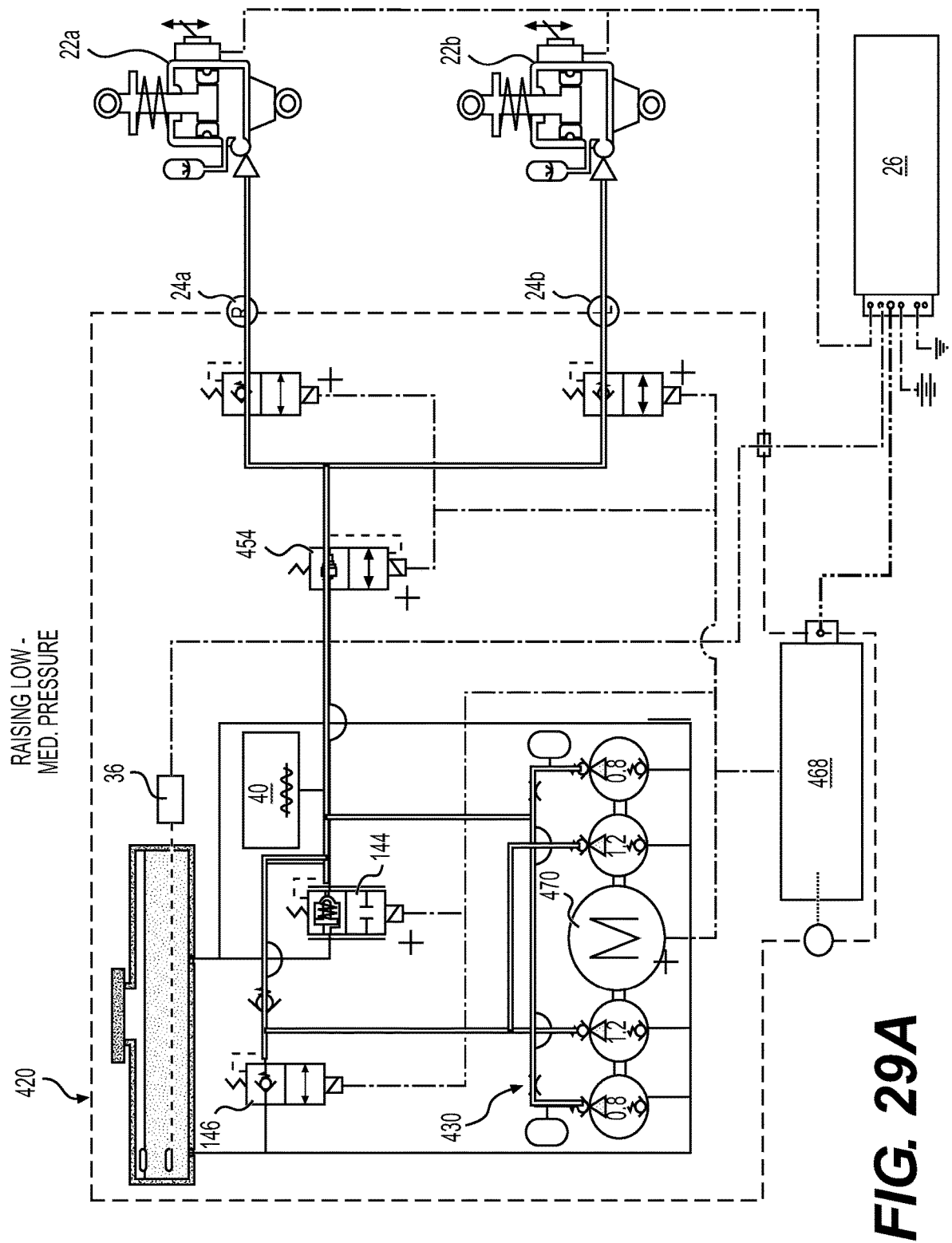
FIG. 29A shows a schematic diagram of the SHLA assembly of FIG. 25, indicating a flow path of fluid for raising the vehicle at low-medium pressure.

FIG. 29A shows a schematic diagram of the fifth SHLA assembly 420, indicating a flow path of fluid for raising the vehicle at low-medium pressure. To quickly raise the trim height of the vehicle the pump motor is turned on, the PCV is held fully or partially closed to adjust flow rates, the three Normally Closed Valves are energized to permit flow.

Figure 29B:
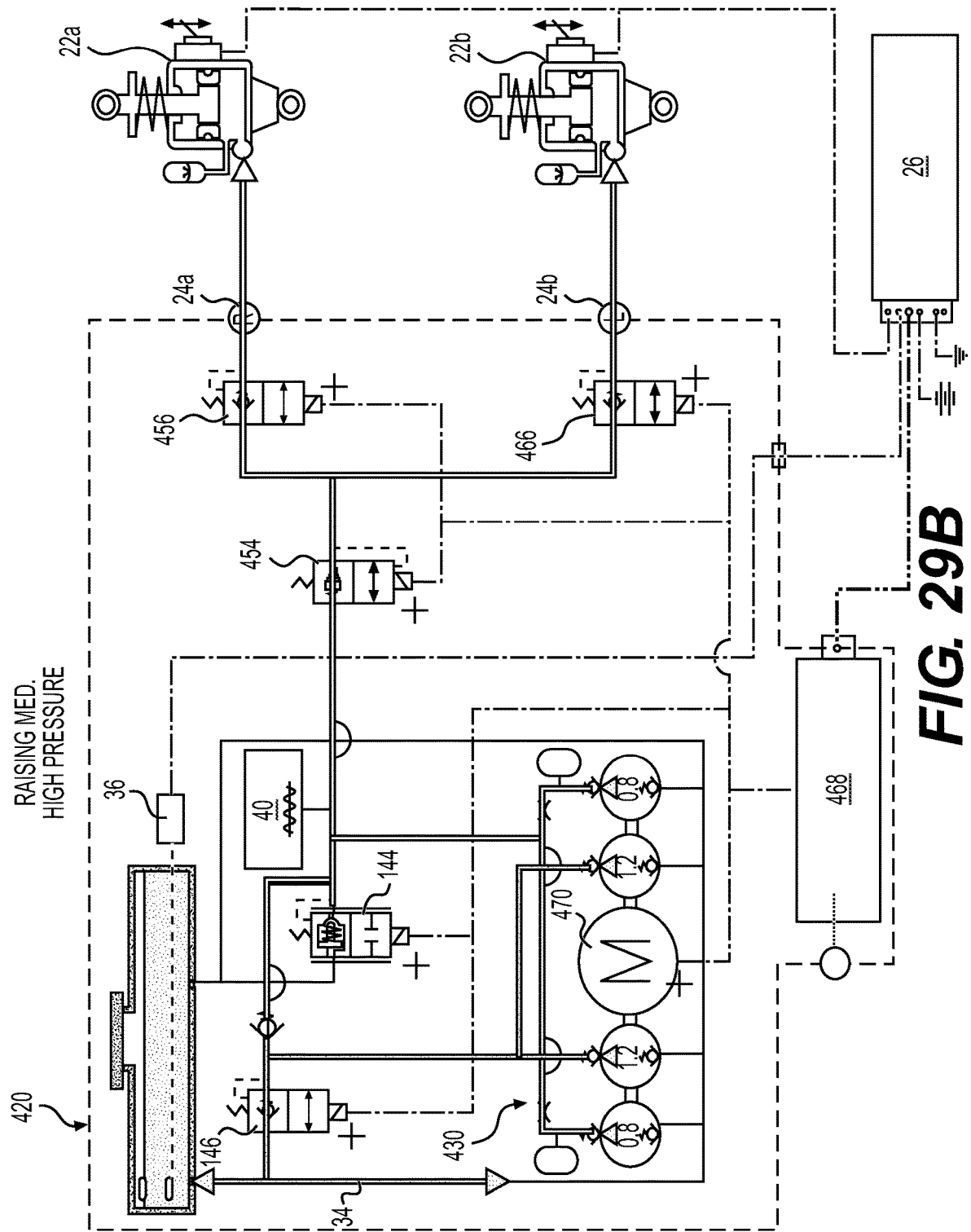
FIG. 29B shows a schematic diagram of the SHLA assembly of FIG. 25, indicating a flow path of fluid for raising the vehicle at medium-high pressure.

FIG. 29B shows a schematic diagram of the fifth SHLA assembly 420, indicating a flow path of fluid for raising the vehicle at medium-high pressure. To reduce current draw on the motor and increase stall pressure, the pump recirculation valve 146 is also energized to unload half of the pump elements and bypass the flow back to reservoir. As pressure increases in this type of system, compliance also decreases lessening the need for very high flow rates. The LOWERING and MAINTAINING functions may operate similarly or identically to the 2-Pump system described above in association with FIGS. 3B-3C.

Figure 30C:
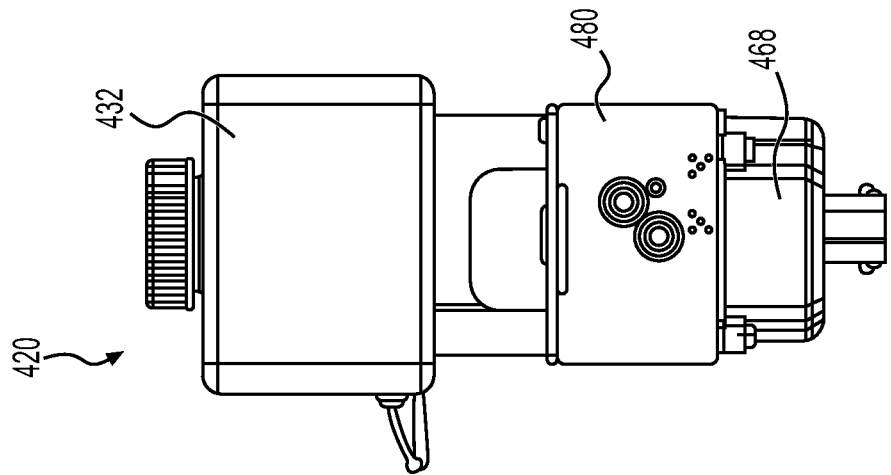
FIG. 30C shows a profile side view of the SHLA assembly of FIG. 25.
Figure 30B:
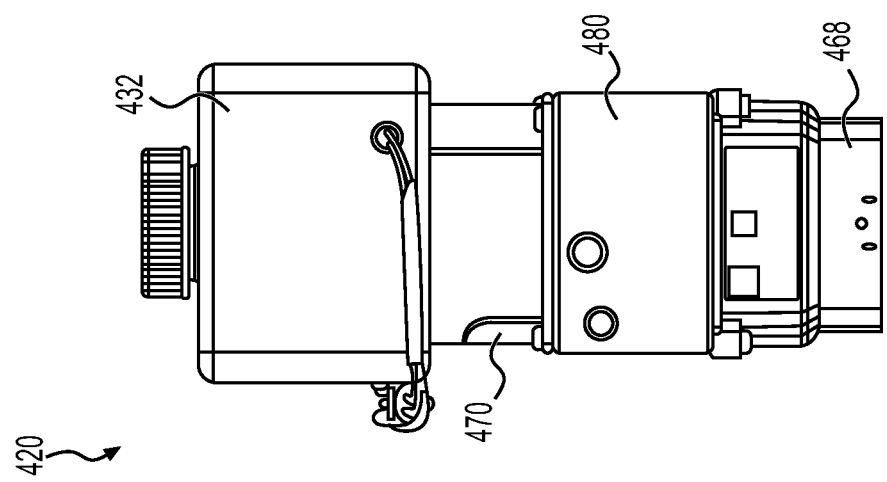
FIG. 30B shows a front-side view of the SHLA assembly of FIG. 25.
Figure 30A:
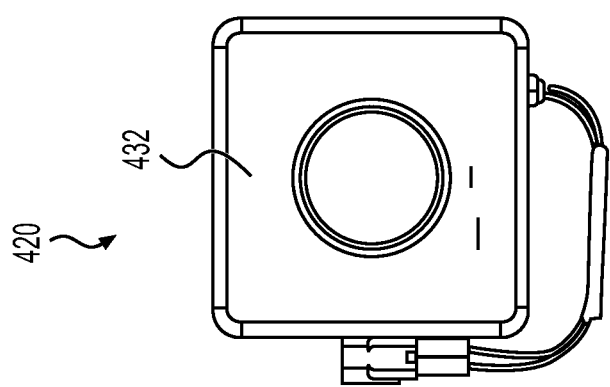
FIG. 30A shows a top view of the SHLA assembly of FIG. 25.

FIGS. 30A-30C show various views of the fifth SHLA assembly 420. The fifth SHLA assembly 420, with its 5-Valve and 4-Pump design, provides a very compact package. Reservoirs may be sized to fit packaging requirements of a given application. The 4-pump, transverse motor uses a 15-degree angular offset to save packaging space.

Figure 31:
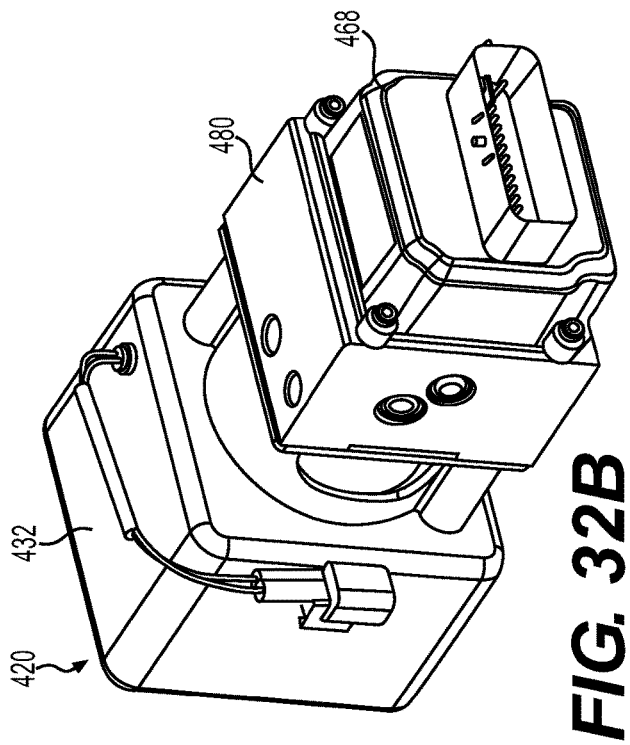
FIG. 31 shows a perspective view of the SHLA assembly of FIG. 25, without the EDC installed.
Figure 32B:
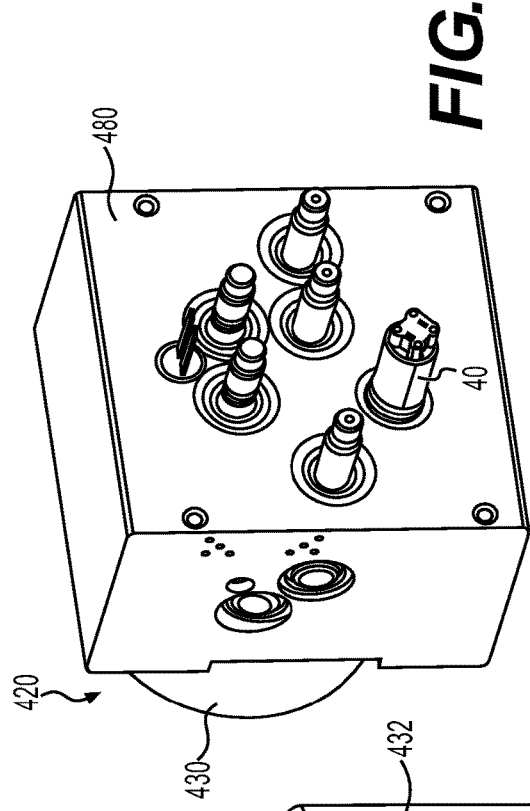
FIG. 32B shows a perspective view of the SHLA assembly of FIG. 25, with the EDC and reservoir attached thereto.
Figure 32A:
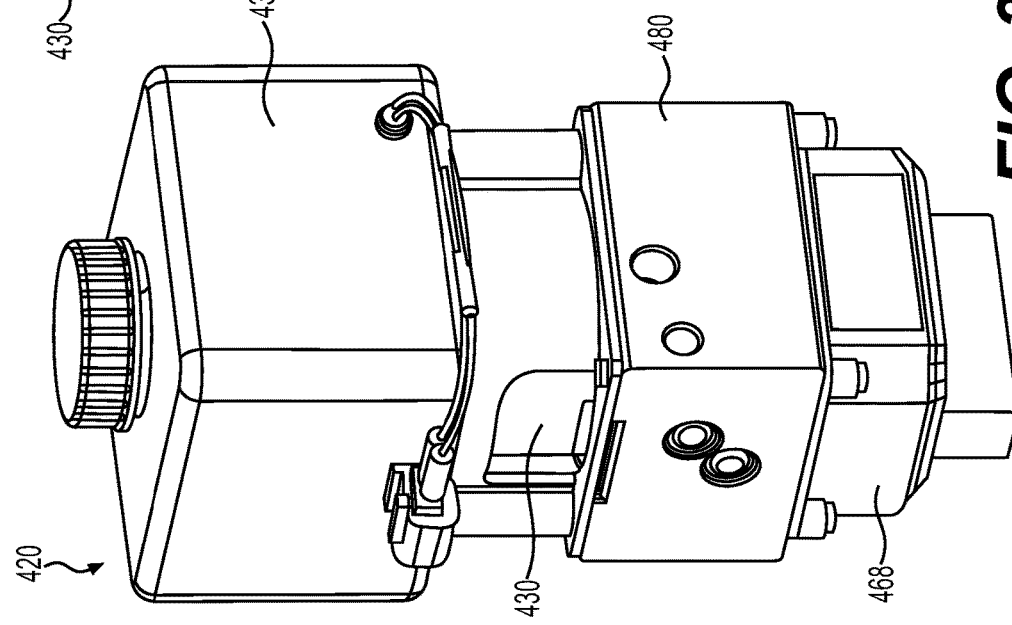
FIG. 32A shows a perspective view of the SHLA assembly of FIG. 25, with the EDC and reservoir attached thereto.
Figure 34:
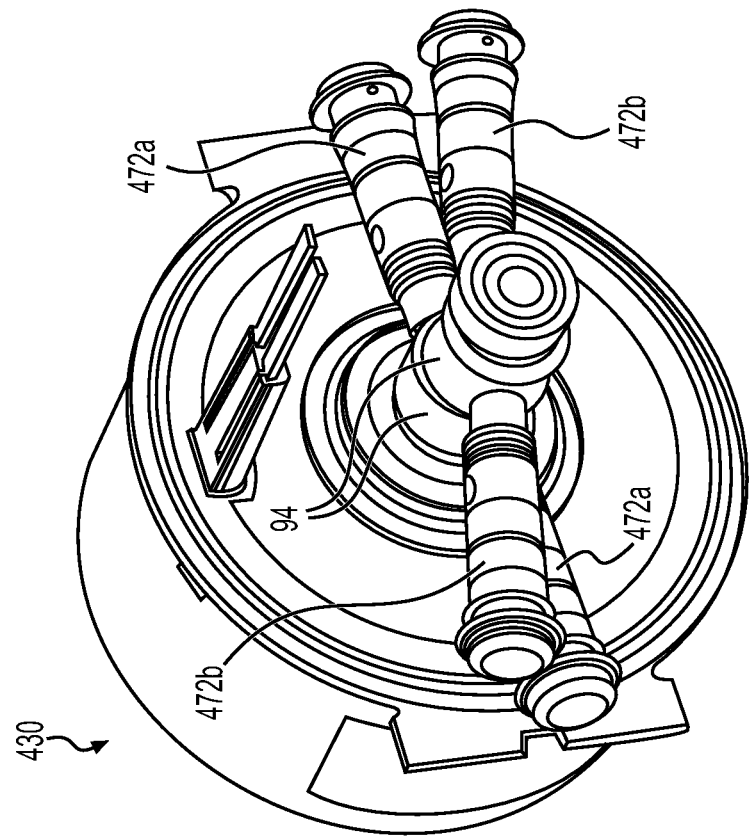
FIG. 34 shows a perspective view of the pump assembly of the SHLA assembly of FIG. 25.
Figure 33:
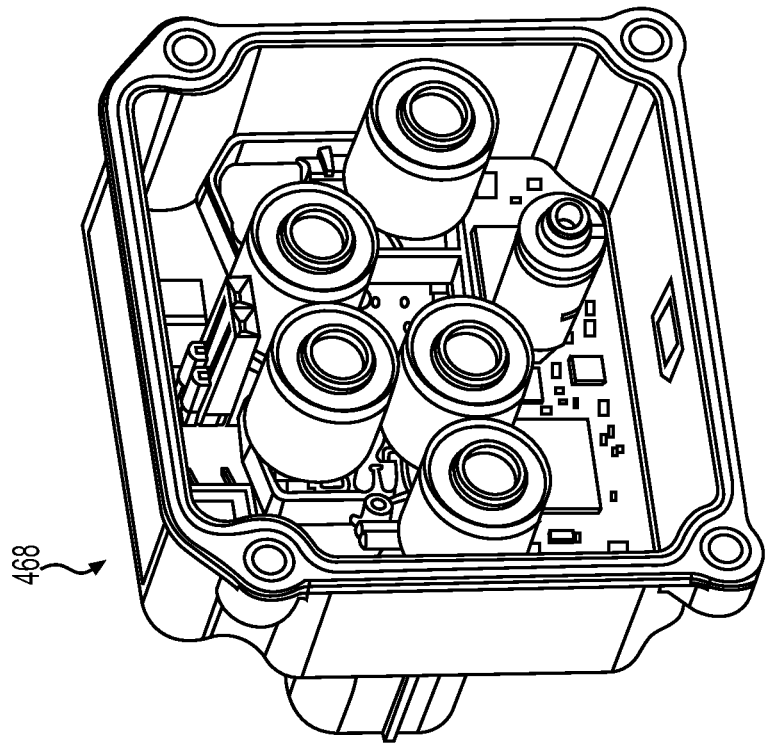
FIG. 33 shows a perspective view of the EDC of the SHLA assembly of FIG. 25.

FIG. 31 shows a perspective view of the fifth SHLA assembly 420, including a fifth HCU body 480 with a fourth pump assembly 430 attached thereto. The fifth HCU body 480 may be similar to the first HCU body 80 of the first SHLA assembly 20, except sized and adapted to hold the five valves and the four pumping elements arranged of the fifth SHLA assembly 420. FIG. 32A shows a perspective view of the fifth SHLA assembly 420, with a fifth EDC 468 and fifth fluid reservoir 432 attached thereto. Specifically, the fifth fluid reservoir 432 is attached to a same top face of the fourth pump assembly 430, straddling around and extending over a top of the fourth pump assembly 430. The fifth EDC 468 is attached to a bottom face of the fifth HCU body 480, opposite from the fourth pump assembly 430. FIG. 32B shows another perspective view of the fifth SHLA assembly 420, with the fifth EDC 468 and reservoir attached thereto. FIG. 33 shows a perspective view of the fifth EDC 468. FIG. 34 shows a perspective view of the fourth pump assembly 430 of the fifth SHLA assembly 420. The 4-Pump design shown in FIG. 34 includes 2 eccentric bearings 94 and pumps arranged at a 15° angular offset to save packaging space.

FIG. 35 shows a cross-section of the third pump assembly 230, which is configured as a wet sump design. As shown, the third pump assembly 230 includes the third electric motor 270 having a first motor shaft 472 that is rotatably supported by a pair of first motor bearings 474. The first motor bearings 474 may include relatively simple and/or inexpensive devices, such as plain bearings or bushings. The third electric motor 270 is attached to a face of the fifth HCU body 480, which contains other components of the third pump assembly 230. The first motor shaft 472 extends through a shaft seal 476 and into a first pump bore 482 defined in the HCU body 480. The first pump bore 482 may be, at least partially, filled with a liquid, such as oil. The shaft seal 476 may block the liquid from contacting electrical components, such as windings, of the third electric motor 270. The fifth HCU body 480 defines a weep hole 484 located on the motor-side of the shaft seal 476 to drain any liquid that migrates past the shaft seal 476, and preventing such liquid from accumulating in the third electric motor 270.

The third pump assembly 230 also includes a stub shaft 486 located within the first pump bore 482 and configured to be rotated by the first motor shaft 472. The stub shaft 486 is supported within the first pump bore 482 by a pair of support bearings 488, with one of the support bearings 488 being located at either axial end thereof and each surrounded by the fifth HCU body 480. The support bearings 488 may each include ball bearings. The eccentric bearings 94 are pressed on to the stub shaft 486 at the appropriate 120-degree angular spacing. The stub shaft assembly can be assembled in-house and press fit or staked into the fifth HCU body 480. The third electric motor 270 may not require expensive ball bearings as the side loads from the pistons are carried by the two support bearings 488. A driver pin 490 with an anti-rattle bias spring 492, such as the hexagonal one shown, makes a connection between the first motor shaft 472 and stub shaft 486 and couples the stub shaft 486 to be rotatably driven by the first motor shaft 472. The shaft seal 476 may include a lip seal that allows the pump sump area within the first pump bore 482 to be partially or fully filled with the liquid.

FIG. 36 shows a perspective view of an eccentric bearing 94 of a pump assembly 30, 130, 230, 430 of the present disclosure. The eccentric bearing 94 may be a commercially available eccentric roller bearing that incorporates an eccentric bushing 95. The eccentric bushing 95 may be press fit onto an appropriately-sized shaft, such as the stub shaft 486.

Figure 37:
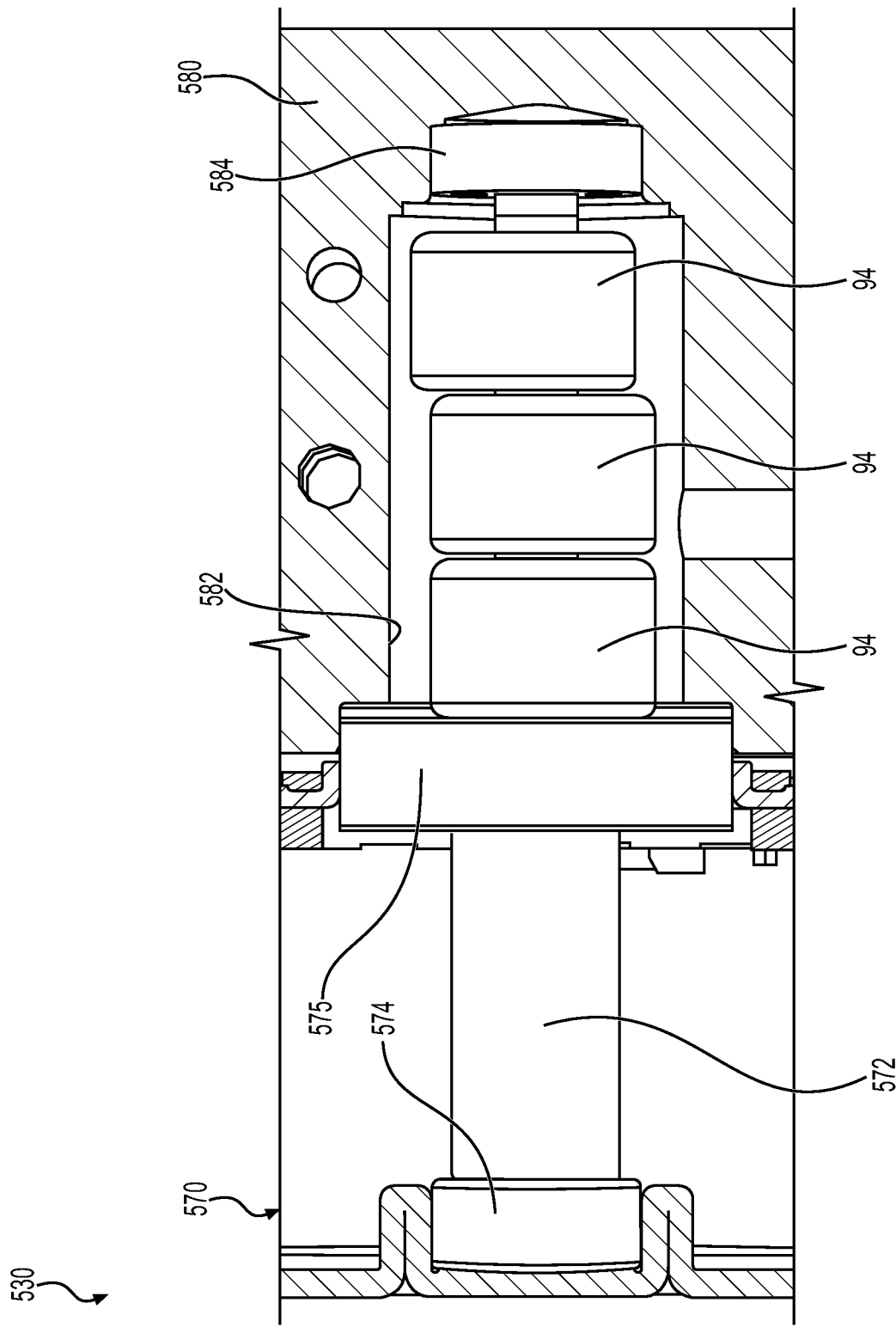
FIG. 37 shows a cross-section of a pump assembly of some embodiments of the present disclosure.

FIG. 37 shows a cross-section of a sixth pump assembly 530 having a dry sump design. The dry sump design of the sixth pump assembly 530 may be incorporated in any of the pump assemblies 30, 130, 230, 430 of the present disclosure. The sixth pump assembly 530 may be similar to the third pump assembly 230 shown in FIG. 36, with a few exceptions. The sixth pump assembly 530 may be configured to be operated dry, without the eccentric bearings 94 being submerged in lubricating fluid, such as oil.

As shown, the sixth pump assembly 530 includes a sixth electric motor 570 having a second motor shaft 572 that is rotatably supported by a second motor bearing 574 and a third motor bearing 575. The second motor bearing 574 and the third motor bearing 575 may each include ball bearings to support loads and torques generated by pistons interacting with the eccentric bearings 94. The sixth electric motor 570 is attached to a face of a sixth HCU body 580, which contains other components of the sixth pump assembly 530. The sixth HCU body 580 defines a second pump bore 582, which may be similar to the first pump bore 482 of the fifth HCU body 480, but without provision to receive a support bearing 488 adjacent to the sixth electric motor 570. Accordingly, the second pump bore 582 may be shorter than the first pump bore 482.

The second motor shaft 572 extends through the second pump bore 582 and is supported at a terminal end thereof, by a pilot ball bearing 584. The eccentric bearings 94 are pressed on to the second motor shaft 572 at the appropriate 120-degree angular spacing and are located axially between the third motor bearing 575 and the pilot ball bearing 584. In the dry sump design, eccentric bearings 94 with integral offset bushings, as noted, are press fit onto the second motor shaft 572. In this design since the second motor shaft 572 is a one-piece motor shaft, the motor bearings 574, 575 may be installed at the time the sixth electric motor 570 is manufactured, particularly if the back of the second motor shaft 572 cannot be supported. The third motor bearing 575, which may also be called the main bearing of the sixth electric motor 570, may be sealed to prevent fluid intrusion.

A hydraulic actuator for a vehicle suspension comprises: a pump assembly including an electric motor coupled to a pump and configured to transfer hydraulic fluid to a discharge header; a first isolation valve having an elastomeric seat and configured to selectively block fluid flow from a port in fluid communication with a height-adjustable damper to the discharge header; and a second isolation valve having a metal seat and connected in series with the first isolation valve to selectively block fluid flow from the port to the discharge header. The pump may include one or more of the first pumping elements 72 of the first pump assembly 30. Alternatively or additionally, the pump may include the first pumping group 172a and/or the second pumping group 172b of the second pump assembly 130. Alternatively or additionally, the pump may include the third pumping group 272a, the fourth pumping group 272b, and/or the fifth pumping group 272c of the third pump assembly 230. Alternatively or additionally, the pump may include the sixth pumping group 472a, and/or the seventh pumping group 472b of the fourth pump assembly 430.

In some embodiments, the hydraulic actuator includes a third isolation valve having an elastomeric seat and a fourth isolation valve having a metal seat, the third isolation valve and the fourth isolation valve being connected in series with one-another and each configured to selectively block fluid flow from a second port in fluid communication with a second height-adjustable damper to the discharge header In some embodiments, the hydraulic actuator includes at least one control valve configured to regulate fluid flow between the discharge header and at least one of the port and the second port for controlling distribution of the hydraulic fluid between the height-adjustable damper and the second height-adjustable damper.

In some embodiments, the at least one control valve includes a first control valve configured to regulate fluid flow between the discharge header and the port, and a second control valve configured to regulate fluid flow between the discharge header and the second port.

In some embodiments, the hydraulic actuator includes a pressure control valve configured to regulate a flow of hydraulic fluid from the discharge header to control a pressure of the hydraulic fluid in the discharge header.

A hydraulic actuator for a vehicle suspension comprises: a pump assembly including an electric motor coupled to a first pump and a second pump, the first pump configured to transfer hydraulic fluid from a supply fluid passage to a first discharge header, and the second pump configured to transfer hydraulic fluid from the supply fluid passage to a second discharge header; and a bypass recirculation valve configured to selectively control fluid flow from the second discharge header to at least one of the supply fluid passage or a fluid reservoir in fluid communication with the supply fluid passage. The first pump may include, for example, the first pumping group 172a of the second SHLA assembly 120. Alternatively or additionally, the first pump may include may include the third pumping group 272a of the third pump assembly 230. Alternatively or additionally, the first pump may include the sixth pumping group 472a of the fourth pump assembly 430. The second pump may include, for example, the second pumping group 172b of the second pump assembly 130. Alternatively or additionally, the second pump may include may include the fourth pumping group 272b of the third pump assembly 230. Alternatively or additionally, the second pump may include may include the seventh pumping group 472b of the fourth pump assembly 430. The bypass recirculation valve may include, for example, the first PRV 146.

In some embodiments, the hydraulic actuator includes a check valve configured to transmit fluid from the second discharge header to the first discharge header while blocking fluid flow in an opposite direction.

In some embodiments, the hydraulic actuator includes a pressure control valve configured to regulate a flow of hydraulic fluid from the first discharge header to control a pressure of the hydraulic fluid in the first discharge header.

In some embodiments, the hydraulic actuator includes at least one isolation valve configured to selectively block fluid flow from a port in fluid communication with a height-adjustable damper to the discharge header.

In some embodiments, the at least one isolation valve includes a first isolation valve having an elastomeric seat, and a second isolation valve having a metal seat and connected in series with the first isolation valve.

In some embodiments, the hydraulic actuator includes a third isolation valve having an elastomeric seat and a fourth isolation valve having a metal seat, the third isolation valve and the fourth isolation valve being connected in series with one-another and each configured to selectively block fluid flow from a second port in fluid communication with a second height-adjustable damper to the first discharge header.

In some embodiments, the at least one isolation valve includes: a first isolation valve having an elastomeric seat and configured to selectively block fluid flow from the first discharge header to an intermediate fluid passage, and a second isolation valve having a metal seat and connected in series with the first isolation valve configured to selectively block fluid flow from the intermediate fluid passage to the port. In some embodiments, the hydraulic actuator further comprises a third isolation valve having a metal seat and configured to selectively block fluid flow from a second port in fluid communication with a second height-adjustable damper to the intermediate fluid passage.

In some embodiments, the first pump and the second pump each have different flow characteristics.

In some embodiments, the first pump and the second pump each include pump elements configured out of phase from one another at regular rotational intervals of the electric motor.

In some embodiments, at least one of the first pump and the second pump includes at least two pistons each driven by the electric motor via a shared eccentric bearing.

In some embodiments, the hydraulic actuator includes: a third pump coupled to the electric motor and configured to transfer hydraulic fluid from the supply fluid passage to a third discharge header; and a second bypass recirculation valve configured to selectively control fluid flow from the third discharge header to at least one of the supply fluid passage or a fluid reservoir in fluid communication with the supply fluid passage. The third pump may include, for example, the fifth pumping group 272c of the third pump assembly 230. The second bypass recirculation valve may include, for example, the second PRV 246.

A hydraulic actuator for a vehicle suspension comprises: a body; a pump assembly including an electric motor configured to displace a piston within the body; and a valve arrangement having at least one solenoid valve for selectively controlling fluid flow from the pump assembly to at least one port for providing hydraulic fluid to a height-adjustable damper. In some embodiments, the valve arrangement and the pump assembly are arranged at least partially inside the body; and the electric motor is arranged on a first face of the body, and the valve arrangement is arranged on a second face of the body that is parallel to and spaced apart from the first face. Examples of such an arrangement are shown in FIGS. 4A-4C, 5A-5C, 13A-13C, 14B-14C, 19A-19C, 20B-20C, 30A-30C, and 32A-32B.

In some embodiments, the hydraulic actuator includes a fluid reservoir disposed on a top face of the body, the top face being perpendicular to each of the first face and the second face. Examples of such an arrangement are shown in FIGS. 4A-4C, 5A-5C, 13A-13C, 14B-14C, 19A-19C, 20B-20C, 30A-30C, and 32A-32B. In some embodiments, the first face is a top face that faces upward with the hydraulic actuator installed in a vehicle. Such an arrangement is shown, for example, in FIGS. 30A-30C, and 32A-32B. In some embodiments, the hydraulic actuator includes a fluid reservoir disposed on the top face of the body and overlying the electric motor. Such an arrangement is shown, for example, in FIGS. 30A-30C, and 32A-32B.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic actuator for a vehicle suspension, comprising:
    a pump assembly including an electric motor coupled to a pump and configured to transfer hydraulic fluid to a discharge header;
    a first isolation valve having an elastomeric seat and configured to selectively block fluid flow from a port in fluid communication with a height-adjustable damper to the discharge header; and
    a second isolation valve having a metal seat and connected in series with the first isolation valve to selectively block fluid flow from the port to the discharge header, wherein the first isolation valve and the second isolation valve are separated from each other in space,
    wherein the pump comprises a first pump and a second pump, and the discharge header comprises a first discharge header and a second discharge header, wherein the electric motor is coupled to the first pump and the second pump, the first pump is configured to transfer hydraulic fluid from a supply fluid passage to the first discharge header, and the second pump is configured to transfer hydraulic fluid from the supply fluid passage to the second discharge header, wherein the hydraulic actuator further comprises a bypass recirculation valve configured to selectively control fluid flow from the second discharge header to the supply fluid passage,
    wherein the hydraulic actuator further comprises: a third pump coupled to the electric motor and configured to transfer hydraulic fluid from the supply fluid passage to a third discharge header; and a second bypass recirculation valve configured to selectively control fluid flow from the third discharge header to at least one of the supply fluid passage or a fluid reservoir in fluid communication with the supply fluid passage.

2. The hydraulic actuator of claim 1, further comprising a third isolation valve having an elastomeric seat and a fourth isolation valve having a metal seat, the third isolation valve and the fourth isolation valve being connected in series with one-another and each configured to selectively block fluid flow from a second port in fluid communication with a second height-adjustable damper to the discharge header.

3. The hydraulic actuator of claim 2, further comprising at least one control valve configured to regulate fluid flow between the discharge header and at least one of the port and the second port for controlling distribution of the hydraulic fluid between the height-adjustable damper and the second height-adjustable damper, wherein the at least one control valve includes at least one normally-open solenoid valve.

4. The hydraulic actuator of claim 3, wherein the at least one control valve includes a first control valve configured to regulate fluid flow between the discharge header and the port, and a second control valve configured to regulate fluid flow between the discharge header and the second port.

5. The hydraulic actuator of claim 1, further comprising a pressure control valve configured to regulate a flow of hydraulic fluid from the discharge header to control a pressure of the hydraulic fluid in the discharge header.

6. A hydraulic actuator for a vehicle suspension, comprising:
    a pump assembly including an electric motor coupled to a first pump and a second pump, the first pump configured to transfer hydraulic fluid from a supply fluid passage to a first discharge header, and the second pump configured to transfer hydraulic fluid from the supply fluid passage to a second discharge header; and
    a bypass recirculation valve configured to selectively control fluid flow from the second discharge header to the supply fluid passage,
    wherein the hydraulic actuator further comprises:
    a third pump coupled to the electric motor and configured to transfer hydraulic fluid from the supply fluid passage to a third discharge header; and a second bypass recirculation valve configured to selectively control fluid flow from the third discharge header to at least one of the supply fluid passage or a fluid reservoir in fluid communication with the supply fluid passage.

7. The hydraulic actuator of claim 6, further comprising a check valve configured to transmit fluid from the second discharge header to the first discharge header while blocking fluid flow in an opposite direction.

8. The hydraulic actuator of claim 6, further comprising a pressure control valve configured to regulate a flow of hydraulic fluid from the first discharge header to control a pressure of the hydraulic fluid in the first discharge header.

9. The hydraulic actuator of claim 6, further comprising at least one isolation valve configured to selectively block fluid flow from a port in fluid communication with a height-adjustable damper to the first discharge header.

10. The hydraulic actuator of claim 9, wherein the at least one isolation valve includes a first isolation valve having an elastomeric seat, and
a second isolation valve having a metal seat and connected in series with the first isolation valve.

11. The hydraulic actuator of claim 9, further comprising a third isolation valve having an elastomeric seat and a fourth isolation valve having a metal seat, the third isolation valve and the fourth isolation valve being connected in series with one-another and each configured to selectively block fluid flow from a second port in fluid communication with a second height-adjustable damper to the first discharge header.

12. The hydraulic actuator of claim 9, wherein the at least one isolation valve includes: a first isolation valve having an elastomeric seat and configured to selectively block fluid flow from the first discharge header to an intermediate fluid passage, and a second isolation valve having a metal seat and connected in series with the first isolation valve configured to selectively block fluid flow from the intermediate fluid passage to the port; and
wherein the hydraulic actuator further comprises a third isolation valve having a metal seat and configured to selectively block fluid flow from a second port in fluid communication with a second height-adjustable damper to the intermediate fluid passage.

13. The hydraulic actuator of claim 6, wherein the first pump and the second pump each have different flow characteristics.

14. The hydraulic actuator of claim 6, wherein the first pump and the second pump each include pump elements configured out of phase from one another at regular rotational intervals of the electric motor.

15. The hydraulic actuator of claim 6, wherein at least one of the first pump and the second pump includes at least two pistons each driven by the electric motor via a shared eccentric bearing.

16. A hydraulic actuator for a vehicle suspension, comprising:
a body;
a pump assembly including an electric motor configured to displace a piston within the body; and
a valve arrangement having at least one solenoid valve for selectively controlling fluid flow from the pump assembly to at least one port which comprises two ports each in fluid communication with a corresponding height-adjustable damper and for providing hydraulic fluid to the corresponding height-adjustable damper, wherein the valve arrangement further comprises a first isolation valve having an elastomeric seat and configured to selectively block fluid flow from one of the two ports in fluid communication with the corresponding height-adjustable damper to a discharge header; and a second isolation valve having a metal seat and connected in series with the first isolation valve to selectively block fluid flow from the one of the two ports to the discharge header, wherein the first isolation valve and the second isolation valve are separated from each other in space;
wherein the valve arrangement and the pump assembly are arranged at least partially inside the body; and
wherein the electric motor is arranged on a first face of the body, and the valve arrangement is arranged on a second face of the body that is parallel to and spaced apart from the first face.

17. The hydraulic actuator of claim 16, further comprising a fluid reservoir disposed on a top face of the body, the top face being perpendicular to each of the first face and the second face.

18. The hydraulic actuator of claim 16, wherein the first face is a top face that faces upward with the hydraulic actuator installed in a vehicle, wherein the hydraulic actuator further comprises a fluid reservoir disposed on the top face of the body and overlying the electric motor.

19. The hydraulic actuator of claim 16, wherein the at least one solenoid valve includes at least one control valve configured to regulate fluid flow between the pump assembly and at least one of the two ports for controlling distribution of the hydraulic fluid between two height-adjustable dampers, wherein the at least one control valve includes at least one normally-open solenoid valve.

* * * * *